(12) United States Patent
Nylander et al.

(10) Patent No.: US 11,240,739 B2
(45) Date of Patent: Feb. 1, 2022

(54) INTELLIGENT TRANSPORT SYSTEM MESSAGE CONTROL METHOD AND ARRANGEMENT

(71) Applicant: Telefonaktiebolaget LM Ericsson (publ), Stockholm (SE)

(72) Inventors: Tomas Nylander, Värmdö (SE); Lisa Boström, Solna (SE); Stefan Runeson, Lund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/343,431

(22) PCT Filed: Oct. 21, 2016

(86) PCT No.: PCT/SE2016/051026
§ 371 (c)(1),
(2) Date: Apr. 19, 2019

(87) PCT Pub. No.: WO2018/074958
PCT Pub. Date: Apr. 26, 2018

(65) Prior Publication Data
US 2019/0320380 A1 Oct. 17, 2019

(51) Int. Cl.
*H04W 48/16* (2009.01)
*H04W 4/38* (2018.01)
(Continued)

(52) U.S. Cl.
CPC ............ *H04W 48/16* (2013.01); *H04W 4/38* (2018.02); *H04W 48/10* (2013.01);
(Continued)

(58) Field of Classification Search
CPC ..... H04W 48/08; H04W 48/10; H04W 48/16; H04W 48/00–20; H04W 74/00;
(Continued)

(56) References Cited

U.S. PATENT DOCUMENTS

2007/0198168 A1* 8/2007 Nathan ............ G08G 1/096811
701/117
2010/0062788 A1* 3/2010 Nagorniak ............ H04W 8/22
455/456.1
(Continued)

FOREIGN PATENT DOCUMENTS

EP 3 023 961 A1 5/2016
GB 2526587 * 5/2014 ............ H04W 48/06

OTHER PUBLICATIONS

International Search Report and Written Opinion issued in International Application No. PCT/SE2016/051026, dated Jul. 17, 2017, 15 pages.
(Continued)

*Primary Examiner* — Warner Wong
(74) *Attorney, Agent, or Firm* — Rothwell, Figg, Ernst & Manbeck, P.C.

(57) ABSTRACT

A method for message control in a cooperative intelligent transport system comprises creating (S3) of a transmission restriction control message. The transmission restriction control message comprises restriction instructions, defining how a transmission restriction demand is to be applied by an on board unit, and validity information. The transmission restriction control message is broadcasted (S4). A method for message control in a cooperative intelligent transport system comprises receiving, in an on board unit, a transmission restriction control message. The transmission restriction control message comprises restriction instructions, defining how a transmission restriction demand is to be applied by the on board unit, and validity information. It is determined whether or not the on board unit fulfils the validity information. If the on board unit fulfils the validity information, the transmissions of messages from the on
(Continued)

board unit are adapted according to the restriction instructions. Corresponding apparatuses are also disclosed.

22 Claims, 11 Drawing Sheets

(51) Int. Cl.
*H04W 48/10* (2009.01)
*H04W 28/02* (2009.01)
*H04L 12/18* (2006.01)

(52) U.S. Cl.
CPC ..... *H04L 12/1886* (2013.01); *H04W 28/0247* (2013.01); *H04W 28/0273* (2013.01)

(58) Field of Classification Search
CPC ............. H04W 28/02; H04W 28/0247; H04W 28/0273; H04W 28/0289; H04L 12/1886; H04L 29/06823; H04L 47/10; H04L 63/10
See application file for complete search history.

(56) References Cited

U.S. PATENT DOCUMENTS

| | | | |
|---|---|---|---|
| 2010/0323698 A1* | 12/2010 | Rune | H04W 48/06 455/436 |
| 2011/0188455 A1* | 8/2011 | Suzuki | H04W 76/18 370/328 |
| 2013/0190025 A1* | 7/2013 | Sakata | H04W 52/343 455/501 |
| 2015/0111599 A1* | 4/2015 | Yamasaki | H04W 4/40 455/456.1 |
| 2015/0189615 A1* | 7/2015 | Rembarz | H04W 60/00 455/435.1 |
| 2015/0341749 A1* | 11/2015 | Jodlauk | H04W 72/0446 455/414.2 |
| 2016/0073298 A1 | 3/2016 | Brahmi et al. | |
| 2016/0142492 A1* | 5/2016 | Fang | H04W 4/44 370/254 |
| 2016/0285960 A1* | 9/2016 | Jodlauk | H04W 4/029 |
| 2018/0072190 A1* | 3/2018 | Kowalski | B60N 2/0244 |
| 2018/0199174 A1* | 7/2018 | Gozalvez-Serrano | H04W 4/44 |
| 2020/0053527 A1* | 2/2020 | Nylander | H04W 4/80 |

OTHER PUBLICATIONS

Ericsson, "Congestion Control of Sidelink-based V2X", 3GPP TSG-RAN WG2 #95bis, Tdoc R2-166965, Kaosiumg, Taiwan, Oct. 10-14, 2016, 4 pages.

Catt, Measurement metric for the congestion level in LTE V2X, 3GPP TSG RAN WG1 Meeting #86bis, R1-1608720, Lisbon, Portugal, Oct. 10-14, 2016, 6 pages.

* cited by examiner

ETSI ITS G5              IEEE WAVE

STANDARD ORG

INTELLIGENT TRANSPORT SYSTEM MESSAGE CONTROL METHOD AND ARRANGEMENT

CROSS REFERENCE TO RELATED APPLICATION(S)

This application is a 35 U.S.C. § 371 National Stage of International Patent Application No. PCT/SE2016/051026, filed Oct. 21, 2016, designating the United States.

TECHNICAL FIELD

The proposed technology generally relates to communication in cooperative intelligent transport systems and in particular to methods and arrangements for handling congestion.

BACKGROUND

Cooperative Intelligent Transport Systems (C-ITS) are systems that utilize Information and Communications Technology (ICT) to support improved safety and more efficient usage of the transportation infrastructure for transport of goods and humans over any transportation mean.

Intelligent Transport Systems (ITS) services, protocols and connectivity solutions are described in specifications issued by standardization bodies like IEEE, SAE, ETSI and ISO. Besides in the mentioned standards, the C-ITS system architecture is elaborated in research collaborations like COmmunication Network VEhicle Road Global Extension (CONVERGE), Nordic Way and in consortiums of automobile manufacturers, suppliers and research organizations like ERTICO and Car-2-Car Communication Consortium.

There is an ongoing discussion regarding connectivity for C-ITS. The discussion is about whether the ETSI ITS G5/IEEE WAVE DSRC solutions, cellular $3^{rd}$ Generation Partnership Project (3GPP) technologies, or a new 3GPP based Long-Term Evolution (LTE) Vehicle-to-anything (V2X) radio solutions should be used, and in what combinations (e.g. hybrid solutions).

C-ITS is based on a frequent short-range communication between different stations or units, mobile or stationary, exchanging e.g. information ranging from position, velocity, environmental conditions, traffic situation etc. When many vehicles are present in a limited area and/or when external conditions are cumbersome, the signaling load becomes large and congestion problems may arise.

One main problem with broadcast technologies and Dedicated Short-Range Communication (DSRC) or corresponding 3GPP based LTE V2X radio solutions technologies is that they rely on a distributed congestion control, i.e. each station or unit, movable or stationary, determines itself when it has to reduce its transmission rate. This means that it is up to each implementation to detect congestion and take action. Even though this is specified to a certain degree, there is a significant likelihood that implementations will differ and cause problems, e.g. cause long time to react. Congestion mitigation is therefore today considered as slightly unreliable.

Furthermore, with broadcast technologies that are using 'listen before talk', there is a large probability that some stations or units will only 'listen' in congestion situations, i.e. the medium is never free for transmission. This is also known as the hidden station problem.

SUMMARY

It is an object to provide methods and devices enabling a more reliable congestion mitigation in C-ITS.

This and other objects are met by embodiments of the proposed technology.

According to a first aspect, there is provided a method for message control in a cooperative intelligent transport system. The method comprises creating of a transmission restriction control message. The transmission restriction control message comprises restriction instructions, defining how a transmission restriction demand is to be applied by an on board unit, and validity information. The transmission restriction control message is broadcasted.

According to a second aspect, there is provided a method for message control in a cooperative intelligent transport system. The method comprises receiving, in an on board unit, a transmission restriction control message. The transmission restriction control message comprises restriction instructions, defining how a transmission restriction demand is to be applied by the on board unit, and validity information. It is determined whether or not the on board unit fulfils the validity information. If the on board unit fulfils the validity information, the transmissions of messages from the on board unit are adapted according to the restriction instructions.

According to a third aspect, there is provided a node configured for communication with on board units in a cooperative intelligent transport system. The node is configured to create a transmission restriction control message. The transmission restriction control message comprises restriction instructions, defining how a transmission restriction demand is to be applied by an on board unit, and validity information. The node is configured to broadcast the transmission restriction control message.

According to a fourth aspect, there is provided an on board unit of a cooperative intelligent transport system, wherein the on board unit is configured to receive a transmission restriction control message. The transmission restriction control message comprises restriction instructions, defining how a transmission restriction demand is to be applied by the on board unit, and validity information. The on board unit is configured to determine whether or not the on board unit fulfils the validity information: The on board unit is configured to adapt, if the on board unit fulfils the validity information, transmissions from the on board unit of messages according to the restriction instructions.

According to a fifth aspect, there is provided a computer program comprising instructions, which when executed by at least one processor, cause the at least one processor to create a transmission restriction control message. The transmission restriction control message comprises restriction instructions, defining how a transmission restriction demand is to be applied by an on board unit, and validity information. The instructions, when executed by the at least one processor, further cause the at least one processor to broadcast the transmission restriction control message.

According to a sixth aspect, there is provided a computer program comprising instructions, which when executed by at least one processor, cause the at least one processor to receive a transmission restriction control message. The transmission restriction control message comprises restriction instructions, defining how a transmission restriction demand is to be applied by the on board unit, and validity information. The instructions, when executed by the at least one processor, further cause the at least one processor to determine whether or not the on board unit fulfils the validity information. The instructions, when executed by the at least one processor, further cause the at least one processor to adapt, if the on board unit fulfils the validity information, transmissions from the on board unit of messages according to the restriction instructions.

According to a seventh aspect, there is provided a computer-program product comprising a computer-readable medium having stored there on a computer program according to the fifth or sixth aspect.

According to an eighth aspect, there is provided a carrier comprising the computer program of the fifth or sixth aspect, wherein the carrier is one of an electronic signal, an optical signal, an electromagnetic signal, a magnetic signal, an electric signal, a radio signal, a microwave signal, or a computer-readable storage medium.

According to a ninth aspect, there is provided a node for communication with on board units in a cooperative intelligent transport system. The node comprises a message handler for creating a transmission restriction control message. The transmission restriction control message comprises restriction instructions, defining how a transmission restriction demand is to be applied by an on board unit, and validity information. The node further comprises a transmitter for broadcasting the transmission restriction control message.

According to a tenth aspect, there is provided an on board unit for communication within a cooperative intelligent transport system. The on board unit comprises a receiver for receiving a transmission restriction control message. The transmission restriction control message comprises restriction instructions, defining how a transmission restriction demand is to be applied by the on board unit, and validity information. The on board unit further comprises a validity checker for determining whether or not the on board unit fulfils the validity information. The on board unit further comprises a message handler for adapting, if the on board unit fulfils the validity information, transmissions from the on board unit of messages according to the restriction instructions.

An advantage of the proposed technology is that it makes it possible to provide a reliable, decentralized fast congestion handling for short range communication.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Throughout the drawings, the same reference designations are used for similar or corresponding elements.

For a better understanding of the proposed technology, it may be useful to begin with a brief overview of some basic features of an ITS system and/or analysis of the technical problem.

Intelligent Transport Systems (ITS) denotes technology applied to transport and infrastructure to transfer information between part systems for improved safety, productivity and environmental performance. This includes stand-alone applications such as traffic management systems, information and warning systems installed in individual vehicles, as well as Cooperative ITS (C-ITS) applications. C-ITS denotes technology applied to vehicle to infrastructure and vehicle-to-vehicle communications within an ITS.

Figure 1:
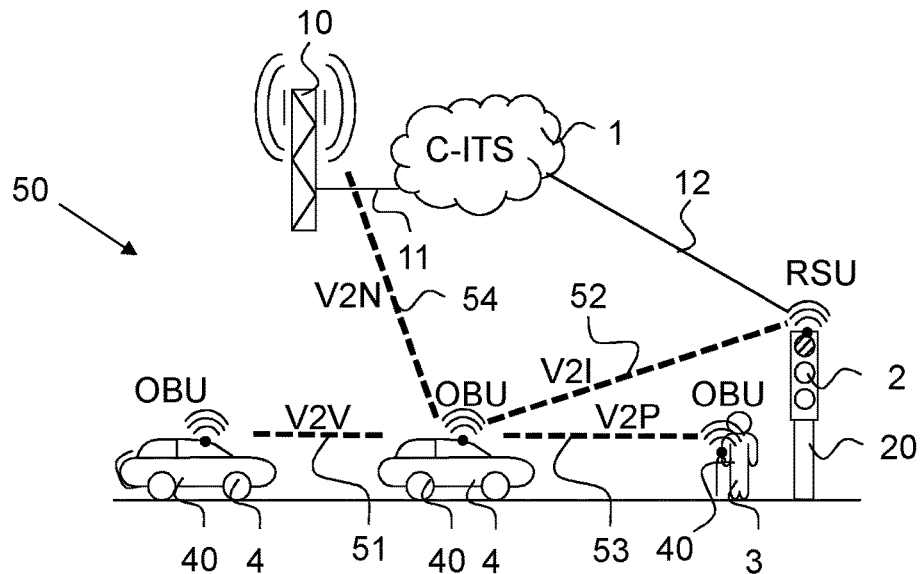
FIG. 1 is a schematic drawing of communication within a C-ITS system.

FIG. 1 depicts schematically a C-ITS system 1. The C-ITS system 1 comprises communication nodes 10, communicating with the core C-ITS system 1 by internal network communication 11, which can be wired and/or wireless. Infrastructure items 2 are provided with Road Side Units (RSU) 20, and communicate with the C-ITS system 1 by a backhaul network 12. This backhaul network can be wired and/or wireless. Non-exclusive examples of common infrastructure items 2 are traffic lights and road signs. Vehicles 4 communicate with different entities in the C-ITS system 1 using an On Board Unit (OBU) 40. OBUs 40 can also be carried by pedestrians 3.

Thus, the communication equipment in these entities is either the RSU 20 or the OBU 40. The OBU 40 can communicate while moving and are either mounted in vehicles 4 or carried by pedestrians 3. For the pedestrian, the OBU 40 is typically a smartphone.

The vehicle communication within the C-ITS system is generally denoted as Vehicle to anything (V2X) 50. The particular types of communication is denoted according to Table 1.

TABLE 1

Vehicle communication to different entities

| Abbreviation | Reference in FIG. 1 | Explanation |
| --- | --- | --- |
| V2V | 51 | Vehicle-to-vehicle |
| V2I | 52 | Vehicle-to-infrastructure |
| V2P | 53 | Vehicle-to-pedestrian |
| V2N | 54 | Vehicle-to-network |

V2X 50 is thus used as a collection name for this type of vehicle communication. V2X extends the safety sensors in a vehicle, e.g. on-board radars and cameras, beyond the limitation of Line-of-Sight (LoS).

Road Side Unit (RSU)

Road Side Units (RSUs) 20 are communication equipment located at the roadside. They are often but not always connected to infrastructure items 2 such as roadside equipment like traffic lights or variable road signs. RSUs are either stationary or sometimes nomadic, e.g. roadwork signs. RSUs are connected to a backhaul network 12. In other words, a RSU is a stationary or nomadic communication equipment arranged for short range communication and connected to a backhaul network of an ITS.

RSUs 20 have two primary functions. A first one is to send V2I messages with information from the connected roadside equipment to OBUs 40. This may e.g. be warning messages (DENM) or Signal Phase and Timing (SPAT) messages for connected traffic lights. The second primary function is to forward multi-hop V2V messages to OBUs 40 and other RSUs 20 to extend coverage area for V2V messages. RSUs 20 that are connected to roadside equipment both send V2I messages and forward multi-hop V2V messages. Other RSUs 20 only forward multi-hop V2V messages to extend coverage area for V2V.

On Board Unit (OBU)

On board Units (OBUs) 40 are normally located in vehicles 4, and normally integrated to the vehicle system and dashboard. They are equipped with a radio, e.g. DSRC for short range communication. In the future, LTE technology might be used for the short range communication. The fact that the OBU 40 is integrated means that it for example can receive events from the vehicle system, display that on a dashboard, or forward information to other vehicles 4 or RSUs 40 using the short range communication or to forward the information to road traffic authorities using a network connection 54. The OBU 40 can of course also receive information on the short range radio or from the network and display or forward that information. In other words, an OBU is a mobile communication equipment arranged for short range communication within an ITS.

As a non-limiting illustrative example, a wheel that loses the grip relative to the road surface can be detected by the vehicle system and a slippery road warning can be distributed with a broadcast message on the short range radio or sent to a central entity for evaluation.

V2X communication may be based upon different technologies, e.g. DSRC or LTE V2X.

Dedicated Short Range Communication (DSRC)

Figure 2:
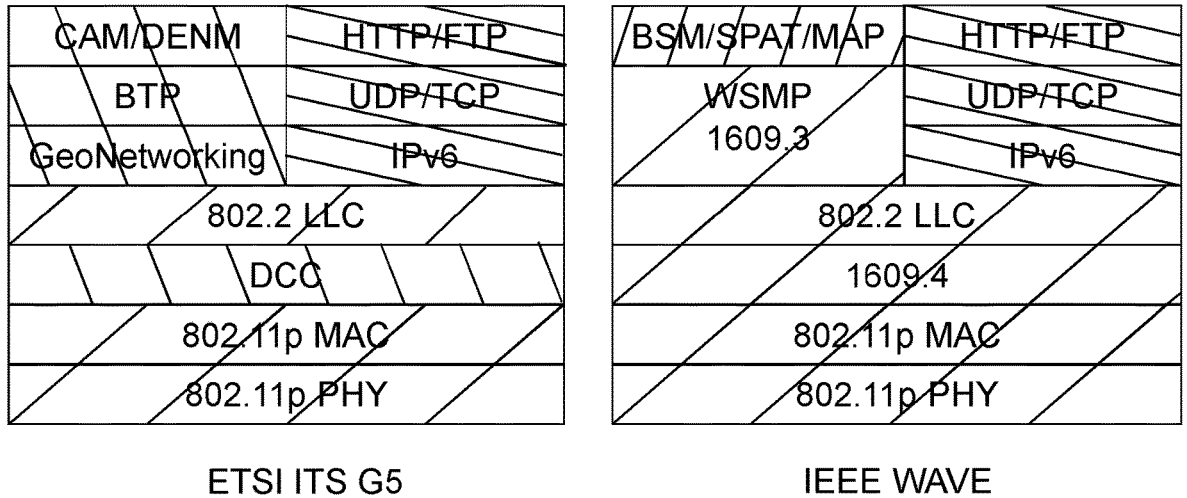
FIG. 2 illustrates DSRC protocol stacks for European and US standards.
Figure 2:
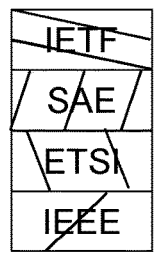

In this document, the term DSRC is used to denote connections based on 802.11p technology. There are presently two Dedicated Short Range Communication (DSRC) standards. ETSI ITS G5 is used in Europe and IEEE Wireless Access in Vehicular Environments (WAVE) is used in the US. FIG. 2 illustrates the similarities and the differences.

Cooperative Awareness Messages (CAM) comprises messages exchanged in the ITS network between ITS stations to create and maintain awareness of each other and to support cooperative performance of vehicles using the road network. A Decentralized Environmental Notification Message (DENM) is a facilities layer message that is mainly used by the ITS applications in order to alert road users of a detected event using the ITS communication technologies. A Basic Safety Message (BSM) typically comprises vehicle position, speed, acceleration vehicle size and brake system status. A Signal Phase And Timing (SPAT) message comprises identification and characterization of signalized intersections. The MapData Message (MAP) is used as wrapper object to relate all the types of maps defined in the standard. The Basic Transport Protocol (BTP) serves for an end-to-end, connection-less transport service in the ITS ad hoc network. Its main purpose is the multiplexing of messages from different processes at the ITS Facilities layer, e.g. CAM and DENM services, for the transmission of packets via the GeoNetworking protocol as well as the de-multiplexing at the destination). Decentralized Congestion Control (DCC) is a component of ITS stations to maintain network stability, throughput efficiency and fair resource allocation to ITS stations. The Medium Access Control (MAC) is responsible for addressing and channel access control mechanisms that make it possible for several terminals or network nodes to communicate within a multiple access network that incorporates a shared medium. The Physical layer (PHY) is responsible for the electrical and physical specifications of the data connection. WAVE Short Message Protocol (WSMP) is responsible for optimizing the transmission on the radio channels.

The different standardization bodies are indicated by the hatching of the boxes in FIG. 2.

Both versions use the same Physical (PHY) layer and Media Access Control (MAC) layer. These layers are according to IEEE 802.11p, an amendment to the IEEE 802.11 standard for wireless access in vehicular environments. The third layer in IEEE WAVE is according to IEEE 1609.4, while the ETSI ITS G5 provides DCC. Both version use Logical link control (LLC) based on IEEE 802.2.

Messages in the radio part of an ITS are generally broadcasted.

TABLE 2

Functions implemented on different layers in ITS G5 and WAVE

| Function | ETSI ITS G5 | IEEE WAVE |
| --- | --- | --- |
| Congestion control | Data link layer Decentralized Congestion Control (DCC) | Application layer Basic Safety Message (BSM) |
| Geo networking | Network layer GeoNetworking protocol | Application layer Similar function as ETSI ITS G5 |
| Retransmission | Application layer Periodic transmission | Application layer Periodic transmission |

TABLE 2-continued

Functions implemented on different layers in ITS G5 and WAVE

| Function | ETSI ITS G5 | IEEE WAVE |
| --- | --- | --- |
| Security | Application layer Signed message and PKI certificate transmitted in every message | Application layer Signed message and PKI certificate transmitted in every message |

In ETSI ITS G5, Decentralized Environmental Notification Messages (DENM) are event based and can be repeated for example as long as the event prevails.

Cooperative Awareness Messages (CAM) are sent periodically, i.e. with a periodicity between 100 ms to is if criteria to send are fulfilled. This can e.g. be that the vehicle has moved a certain distance, or that the direction has changed, etc.

Higher layer protocols are different in ITS G5 and WAVE, and different functions are sometimes solved on different layers, see Table 2.

Although IP based communication is standardized in both ITS G5 and WAVE, it is not commonly used in practice.

LTE V2X

3GPP has recently started standardization activities for V2X services. The major benefits of LTE based V2X services are the possibility to reuse installed LTE infrastructure as well as installed LTE connectivity in vehicles.

The application messages for LTE V2X services used for V2V and V2I are the same or similar as for DSRC, i.e. broadcast of CAM, DENM and possibly Signal Phase and Timing/MapData Messages (SPaT/MAP), but using LTE technology for the short range communication instead of DSRC. The LTE technology is using the so called 'sidelink' (also known as PC5) that is based on the LTE Device to Device communication solution.

That LTE technology should be used for the short range communication is the aim for the ongoing 3GPP standardization.

At present time it is unclear which technology will be the globally selected one to use for direct communication among vehicles, infrastructure and pedestrians. It is even quite likely that there will be no global standard, and that different technologies will be used in different parts of the world. It should also be noted that with DSRC-based technology, the US (IEEE WAVE) and European (ITS-G5) protocol flavors differ slightly.

In the US there are legislative proposals for mandating DSRC in new vehicles manufactured from 2019. Also, considering there have already been several V2X trials using DSRC-based technology, as well as that there are existing commercial products available, it may even be so that DSRC technology would be deployed initially and then eventually swapped to LTE and/or 5G later on. In such case there would be an interim time when both technologies would need to co-exist.

In an C-ITS, a number of vehicles equipped with OBUs are movable on paths and in areas determined by the infrastructure of the region in which the C-ITS is implemented. CAMs or BSMs are frequently broadcasted from the OBUs informing about e.g. the current position and velocity of the vehicle. Additional information may also give rise to DENMs or similar messages. In situations where the environmental conditions are unfavorable and/or if the density of vehicles is high, the number of messages within the C-ITS may be very large indeed and may occupy the entire radio resource space dedicated to the C-ITS.

Congestion mitigation performed according to the DCC provides means for reducing the drawbacks of signaling congestion. However, the DCC is applied decentralized by each individual unit. The exact behavior of the DCC may differ from one equipment provider to another or even between different units from the same provider.

If a particular type of OBU is capable of providing a very fast congestion mitigation and already at relatively low congestion levels, the result may be that other, slower or less sensitive, OBUs may continue to transmit without any congestion mitigation at all, not allowing the first type of OBUs to re-enter into non-mitigation conditions. Such scenarios will thus favor units having a less efficient congestion mitigation on expense of the good ones. This calls for some kind of coordination of congestion mitigation actions.

According to the technology presented here, new broadcast messages are introduced for the short range communication that provide a control plane. This new broadcast control messages govern which messages and how frequent messages should be sent by OBUs under certain conditions. These conditions could be OBUs in a given area and/or during a certain time period.

These control messages should preferably be possible to send from a central entity, e.g. a RSU or an eNB in a congested area. The control messages contain instruction about how the congestion mitigation control is to be performed, e.g. what types of messages that is allowed to be sent and/or a shortest permitted frequency of transmissions of such messages. The control messages contain validity information, e.g. area information where the control message is applicable, i.e. the restriction area, and/or time information defining a time period for which the control message is applicable, i.e. the restriction time period.

Preferably, when OBUs leave the restriction area or when the restriction time period expires, the OBUs return to their normal mode of operation, i.e. again adhere to the relevant standards.

Preferably, if an OBU receives control messages about congestion mitigation from more than one central entity regarding a certain area and/or time period, the OBU should comply with the most stringent requirements in that area/time.

Preferably, the frequency band dedicated for ITS traffic could furthermore be partitioned to have a small dedicated channel for these control messages.

Preferably, the use of the control channel or sending of control messages could be dynamic, i.e. when e.g. the RSU sense that the traffic intensity reaches a certain level it starts sending control messages.

Figure 3:
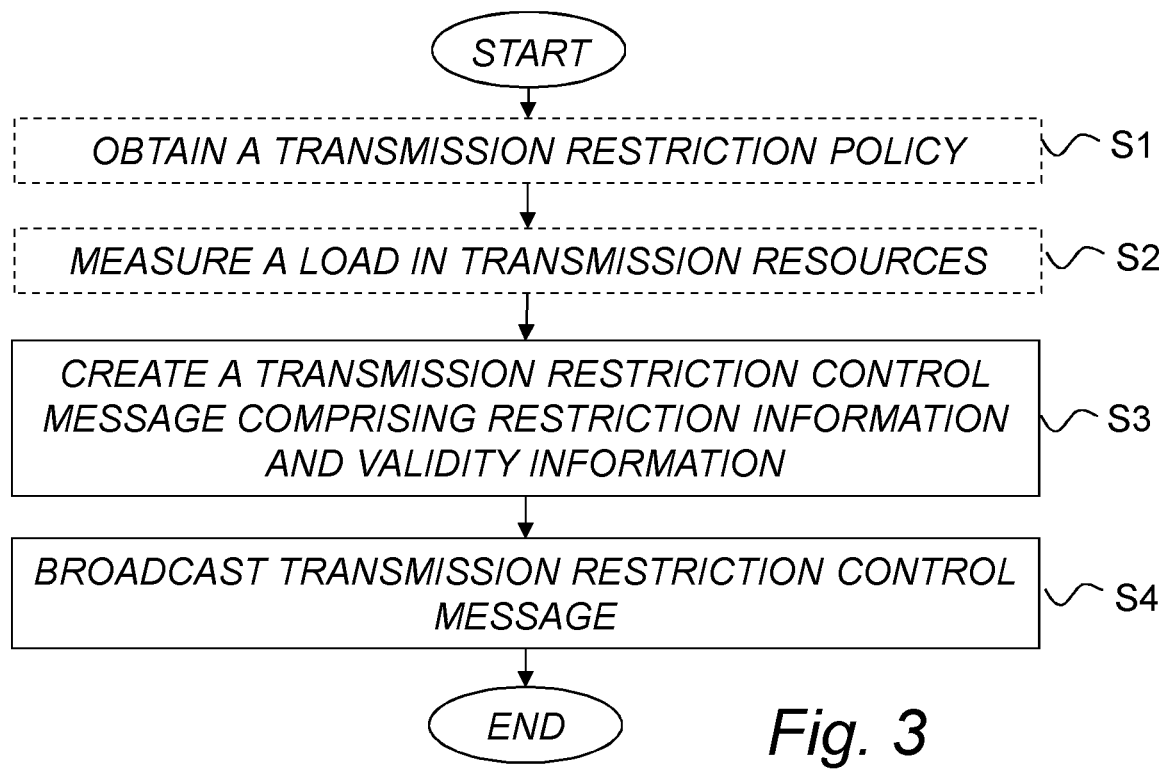
FIG. 3 is a schematic flow diagram illustrating steps of an embodiment of a method for message control in a cooperative intelligent transport system.

FIG. 3 is a schematic flow diagram illustrating an example of a method for message control in a cooperative intelligent transport system. In step S3, a transmission restriction control message is created. The transmission restriction control message comprises restriction instructions and validity information. The restriction instructions define how a transmission restriction demand is to be applied by an on board unit. The restriction instructions may be of different kinds, depending on system configuration, the current transport situation etc.

In one embodiment, the restriction instructions comprise a definition of messages to which the transmission restriction demand is to be applied.

In a further embodiment, the definition of messages to which the transmission restriction demand is to be applied comprises one or more of message types, message priority, and messages transmitted from particular types of transmitting nodes.

The restriction instructions may then be used to favour or disfavour different messages or information. For instance, transmitting nodes situated on emergency vehicles could be favoured by demanding a restriction for all other types of vehicles. Likewise, low-prioritized messages could be suppressed when the overall signalling load is high. Moreover, messages sent from different nodes, but with essentially the same content could be reduced.

In one embodiment, the restriction instructions comprise a requested transmission timing of messages to which the transmission restriction demand is to be applied.

In a further embodiment, the requested transmission timing comprises at least one of a shortest allowed time between successive transmissions and no transmissions at all permitted.

The restriction instructions may then be used to decrease the repetition frequency of transmissions from the on board units or may even stop the transmissions as long as the on board unit fulfils the validity information.

In certain embodiments, the requested transmission timing is combined with definition of messages to which the transmission restriction demand is to be applied.

The restriction instructions may then be used to favour or disfavour different messages or information. Emergency transmissions may e.g. still be allowed, while low priority messages are demanded to be transmitted with reduced repetition frequency.

The type of control could for example be, what priority of DENM messages that the OBUs are allowed to send, maximum repetition rate for DENM and CAM, or what type of messages to send or not. For instance, the control could demand not to send warning messages about slippery road or rain if such warnings already have been broadcasted. The type of control could state what vehicle types that are allowed to send, e.g. only emergency vehicles allowed. Of course a combination of all such scenarios would be possible.

In one embodiment, the validity information comprises an identification of a restriction area for which the transmission restriction demand is valid. It is thereby intended that any receiving on board unit being positioned within such a restriction area should adapt its transmissions according to the restriction instructions enclosed in the same transmission restriction control message.

In one embodiment, the validity information comprises a definition of a restriction time interval for which the transmission restriction demand is valid. It is thereby intended that any receiving on board unit should adapt its transmissions according to the restriction instructions enclosed in the same transmission restriction control message during the restriction time interval.

In step S4, the transmission restriction control message is broadcasted.

Preferably, this broadcasting is performed repeatedly. Such repetition can be regular or intermittent.

In one embodiment, the broadcasting is performed over an area within the restriction area. Such a broadcasting is aimed for informing on board units that just have been turned on about the prevailing conditions within the restriction area. Moreover, any changes of the transmission restriction control message, e.g. concerning the validity information or the restriction instructions, can be presented to vehicles being present in the restriction area.

Preferably, a certain transmission restriction control message is broadcasted over the entire restriction area. This can be obtained by cooperation between a number of nodes, e.g. a group of road side units or eNBs, where all nodes broadcast the same transmission restriction control message.

In one embodiment, the broadcasting is performed over an area outside the restriction area. This can be useful e.g. in areas where vehicles are heading towards a restriction area. The OBUs may then register the transmission restriction control message and prepare for obeying the restriction demands when the vehicle enters into the restricted area.

In one embodiment, the broadcasting is performed over a dedicated wireless communication resource. A part of the ITS spectrum is allocated for control information to ensure that this important information can be transmitted. In this part of the spectrum the RSUs can broadcast control information in new ITS messages to control the usage of ITS messages in the rest of the ITS spectrum. This enables the on board units to perform a rapid identification of a reception of transmission restriction control messages at the same time as the probability for available radio resources for the transmission restriction control message is increased.

The basis on which a transmission restriction control message is created may differ. One possible scenario is that the transmission restriction control message is created according to a certain transmission restriction policy. This is indicated in FIG. 3 as step S1. There, the method of such an embodiment further comprises obtaining of a transmission restriction policy, whereby the creating of the transmission restriction control message is performed according to the obtained restriction policy. The transmission restriction policy governs the creation of the transmission restriction control message, e.g. by providing a set of rules according to which the message is created.

In one embodiment, such a policy could be provided e.g. in a memory in the node itself or as a programmed code, i.e. the transmission restriction policy is static, at least for certain time periods.

Alternatively, the transmission restriction policy may be provided by an external part, typically a control node of the C-ITS, and in such an embodiment, the obtaining of the transmission restriction policy also comprises receiving of the transmission restriction policy from a control node of the cooperative intelligent transport system. In such a way, the ITS can control e.g. a set of RSUs to broadcast transmission restriction control messages according to updated conditions by simply providing an updated transmission restriction policy through the backhaul connections.

The transmission restriction policy may comprise definitions of time intervals during which the broadcasting is to be performed. Such time intervals could be compulsory or conditionally, depending on other factors as well. The transmission restriction policy may also define a set of restrictions that the transmission restriction control message may be selected from.

An example use of this would be that RSUs are placed on the roads leading into a city. The RSUs would broadcast different information depending on the time of the day, e.g. during rush hours the RSUs broadcast that only certain priorities of DENM messages should be sent from vehicles and that no CAM messages should be sent. In other words, it is more important to know where there are accidents than to have a fully updated position and velocity of each vehicle. In such case, a restriction area indicating the city would preferably be included in the control message. When OBUs detect that the vehicle has left the restriction area, normal message handling is preferably resumed, as will be discussed further below.

In many cases, the central parts of the ITS may not be fully updated about the local conditions within the coverage area of the ITS. However, the RSUs are often aware of e.g. the local and current load in the transmission resources used by the ITS or the local weather conditions. In such cases, it may be beneficial to let an external event trig the creation of the transmission restriction control message.

In one embodiment, and as illustrated by step S2 in FIG. 3, a load in the transmission resources dedicated to the cooperative intelligent transport system is measured. The creating of the transmission restriction control message may then be triggered if the measured load exceeds a predetermined threshold.

In certain embodiments, the trigging itself can be defined by the transmission restriction policy, e.g. by defining the predetermined threshold for a local signalling load. Some examples may illustrate the vast possibilities of controlling the creation of the transmission restriction control messages.

An example would be that the RSUs have sensors and can detect weather conditions, or get informed about the weather from a central entity, and thus can send out control information that DENM messages pertaining to weather should not be sent. This may avoid that the spectrum is polluted with this redundant information. Also in this scenario, a restriction area could preferably be included. When OBUs detect that the vehicle left the restriction area, normal message handling is preferably resumed, as will be discussed further below.

Another example is that RSUs are placed in places known to encounter congestion situations, e.g. major intersections. Then, those RSUs can listen to the traffic and when the load reaches a certain level, the RSUs can start sending the control messages to limit/prevent a congestion situation. Such limitations could e.g. be to lower the repetition rate of e.g. CAM messages. Also in this scenario the control messages could preferably contain a restriction area in where vehicles are restricted.

Figure 21:
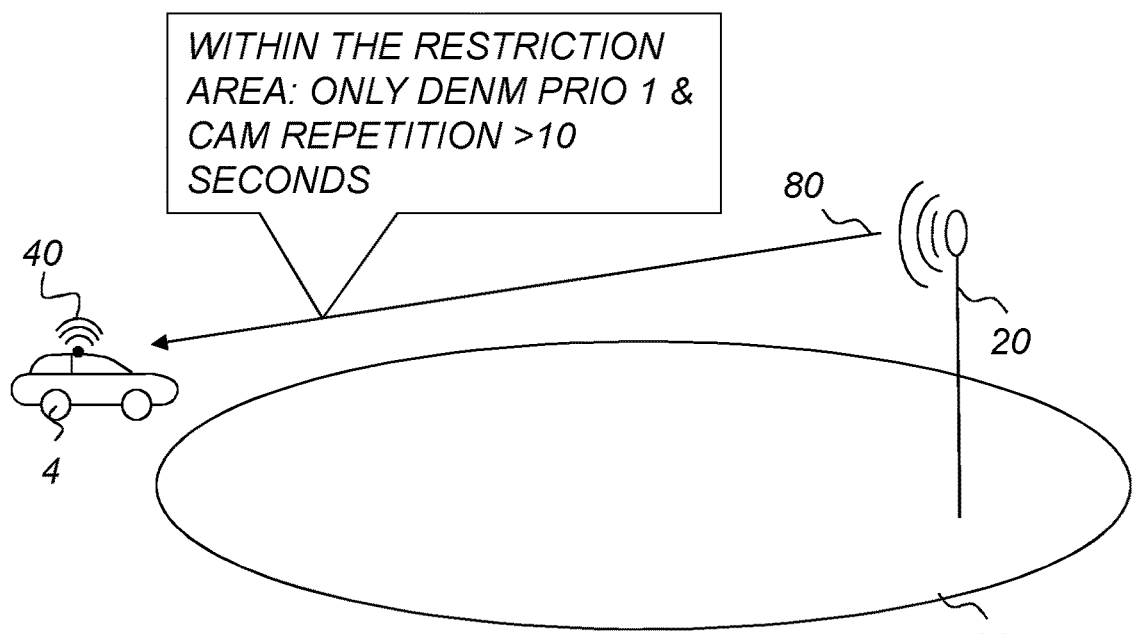
FIG. 21 shows a situation of congestion control by a very schematic illustration.

FIG. 21 shows a situation of congestion control by a very schematic illustration. A vehicle 4, having an OBU 40 is heading towards a RSU 20. The RSU 20 is located e.g. in a congested area or located at the entrance roads to a city. The RSU 20 broadcasts the conditions that should be applied in the restriction area 90 in a transmission restriction control message 80. The area information is also sent in the message transmission restriction control message 80. In this example the RSU 20 instructs OBUs 40 to only send DENM messages tagged as priority 1, and that CAM should not be broadcasted more that maximum every 10 seconds.

Figure 22:
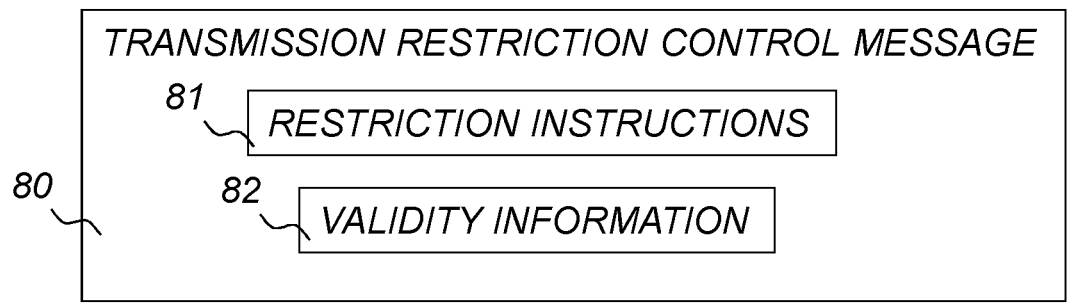
FIG. 22 is a schematic illustration of a transmission restriction control message.

FIG. 22 illustrates schematically a transmission restriction control message 80. The transmission restriction control message 80 comprises restriction instructions 81 and validity information 82.

The specific details of the underlying communication technology for the transmission of the transmission restriction control message is of no main importance for the basic ideas presented here. Any technology providing V2X short range communication may be utilized. As briefly mentioned above, the most common approach today is to use any of the variations of the DSRC standards. In other words, in a particular embodiment, the broadcasting may be performed according to dedicated short-range communication formats.

However, there are alternatives. In another embodiment, the broadcasting is performed according to LTE V2V/V2I formats. As mentioned above, this technology may be the natural choice in a near future.

However, there is additional development going on, e.g. within the LTE 5G technology and also such communication technology may be useful for the purposes discussed in the present disclosure. In other words, in one embodiment, the broadcasting may be performed according to LTE 5G formats.

The creation of the transmission restriction control messages allows for a reliable congestion mitigation within an ITS by providing the right information to the different OBUs at the right places and times. However, in order to effectuate the congestion mitigation in reality, also the OBUs are involved.

Figure 4:
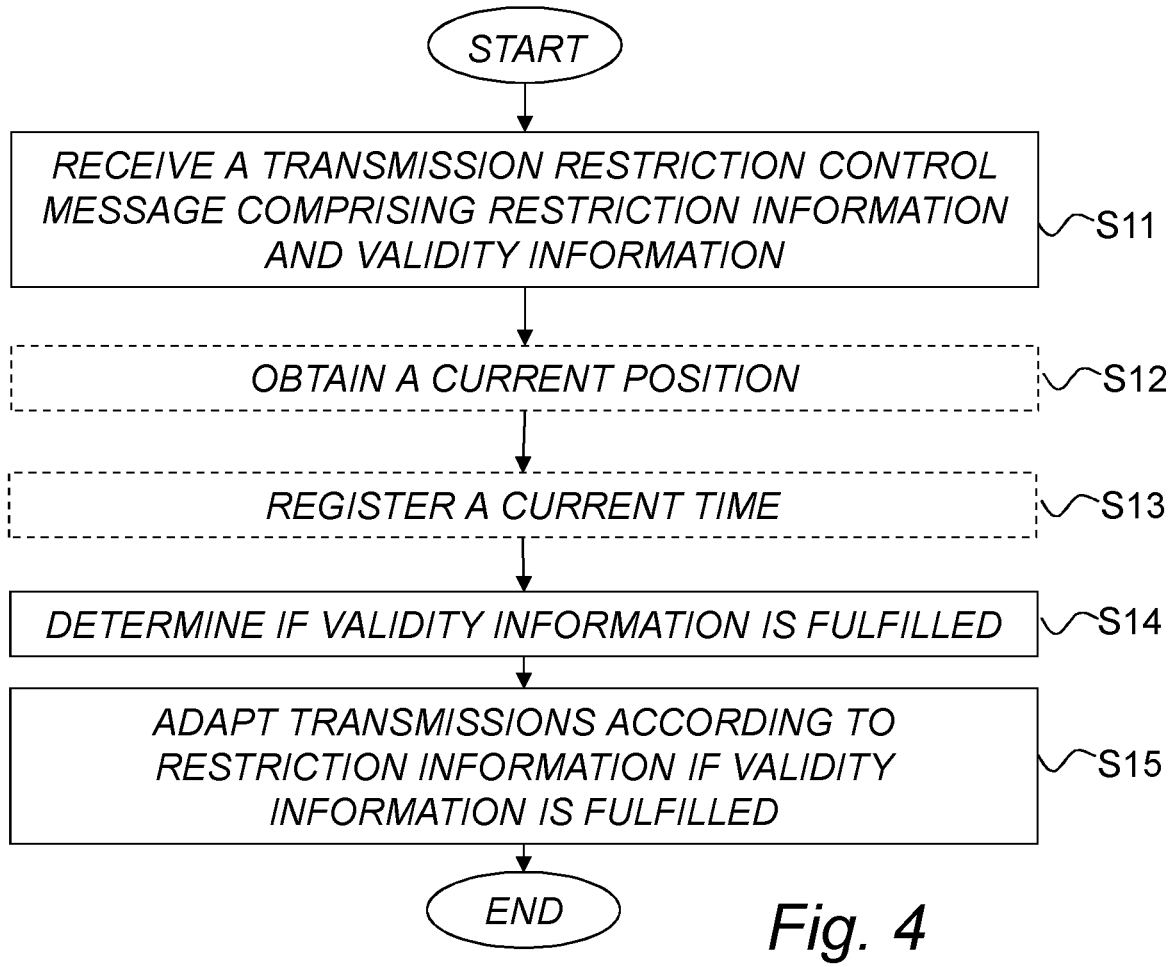
FIG. 4 is a schematic flow diagram illustrating steps of an embodiment of a method for message control in a cooperative intelligent transport system.

FIG. 4 is a schematic flow diagram illustrating steps of an embodiment of a method for message control in a cooperative intelligent transport system. In step S11, a transmission restriction control message is received in an on board unit. The transmission restriction control message comprises restriction instructions and validity information. The restriction instructions define how a transmission restriction demand is to be applied by the on board unit. In step S14, it is determined whether or not the on board unit fulfils the validity information. In step S15, transmissions from the on board unit of messages are, if the on board unit fulfils the validity information, adapted according to the restriction instructions. In other words, the OBU performs a congestion mitigation according to demands of another node in the ITS if the demands are intended for the receiving UBO.

In one embodiment, the method further comprises a step S12, in which a current position of the on board unit is obtained. This can be performed according to any known positioning methods. Non-exclusive examples could be by means of GPS positioning units or by various wireless communication positioning methods, as such well-known in prior art. The positioning may preferably be performed in the OBU itself but may also be performed externally and provided to the OBU e.g. by signalling. The validity information comprises an identification of a restriction area for which the transmission restriction demand is valid. The step S14 of determining whether or not the on board unit fulfils the validity information consequently comprises determining of whether or not the current position of the on board unit is situated within the restriction area.

In one embodiment, the method further comprises a step S12, in which a current time is registered. This can be performed according to any known timing methods. A synchronized system clock of the OBU may be utilized for this purpose. Such timing procedures are, as such, well-known in prior art. The validity information comprises a definition of a restriction time interval for which the transmission restriction demand is valid. Consequently, the step S14 of determining whether or not the on board unit fulfils the validity information comprises determining whether or not the current time falls within the restriction time interval.

In one embodiment, the restriction instructions comprise a definition of messages to which the transmission restriction demand is to be applied. The step S15 of adapting is then preferably performed on messages fulfilling this definition of messages.

In a further embodiment, the definition of messages to which the transmission restriction demand is to be applied comprises message types, message priority, and/or messages transmitted from particular types of transmitting nodes.

In one embodiment, the restriction instructions comprise a requested transmission timing of messages to which the transmission restriction demand is to be applied. Thereby, the step S15 of adapting may preferably be performed according to this requested transmission timing.

In a further embodiment, the requested transmission timing comprises a shortest allowed time between successive transmissions and/or no transmissions at all permitted.

Since the time (by necessity) and often also the position of an OBU will change with time, the certainty of the outcome of step S14 will gradually decrease. It is therefore preferred if the OBU now and then repeats the determination and considers if the adaption has to be changed. Since the position of an OBU is individual, there is no possibility to, in a centralized manner, broadcast a terminating message when an OBU leaves the restricted area. Therefore, such validity check repetitions are preferably performed in each OBU separately.

In other words, in on embodiment, the method performed in the OBU further comprises to regularly or intermittently re-perform the determining step whether or not the on board unit still fulfils the validity information. The method preferably further comprises interrupting the adapting if the on board unit no longer fulfils said validity information. The transmission of messages may therefore be resumed according to standard routines, or by any other overlapping congestion mitigation procedure.

As discussed above in the connection of the transmission restriction control message broadcasting node, such broadcasting is preferably performed over dedicated radio resources. This has in such cases to have a correspondence in the OBU. In other words, in one embodiment, the receiving is performed over a dedicated wireless communication resource.

Also in analogy with what was discussed above, in one embodiment, the receiving is performed according to dedicated short-range communication formats. In another embodiment, the receiving is performed according to LTE V2V/V2I formats. In yet another embodiment, the receiving is performed according to LTE 5G formats.

In different situations, the necessary congestion mitigation actions may differ between different overlapping areas and/or in time. If one degree of congestion mitigation was concluded to be optimal in a certain area at a certain time, the situation may change and call for changes in restriction areas, time intervals or in the degree of mitigation efforts. For instance, if a normal rush hour traffic jam first is present, a first level congestion mitigation operation may be necessary for a large area. If then a traffic accident occurs, a local severe traffic jam may be the result, and an additional more powerful congestion mitigation for a smaller area may be necessary.

In one scenario, it may therefore be necessary for one and the same node to broadcast different transmission restriction control messages at different times. For the OBU point of view, more than one different transmission restriction control message are received from a same broadcasting node but at different occasions.

In another scenario, it may be necessary for different nodes to broadcast different transmission restriction control messages that may at least partially cover the same spatial and/or time ranges. For the OBU point of view, more than one different transmission restriction control message is received from different broadcasting nodes.

In either of these scenarios, the OBU has to handle the case of more than one simultaneously valid transmission restriction control messages. In one embodiment, the step of receiving comprises receiving, in the on board unit, of more than one different transmission restriction control message. The adapting is then performed according to a most restrictive combination of transmission restriction control message whose validity information is fulfilled by the on board unit. In such a manner, it can be assured that the congestion mitigation will be sufficient, according to the transmission restriction control messages, in all areas and during all times.

It will be appreciated that the methods and devices described herein can be combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

Figure 5:
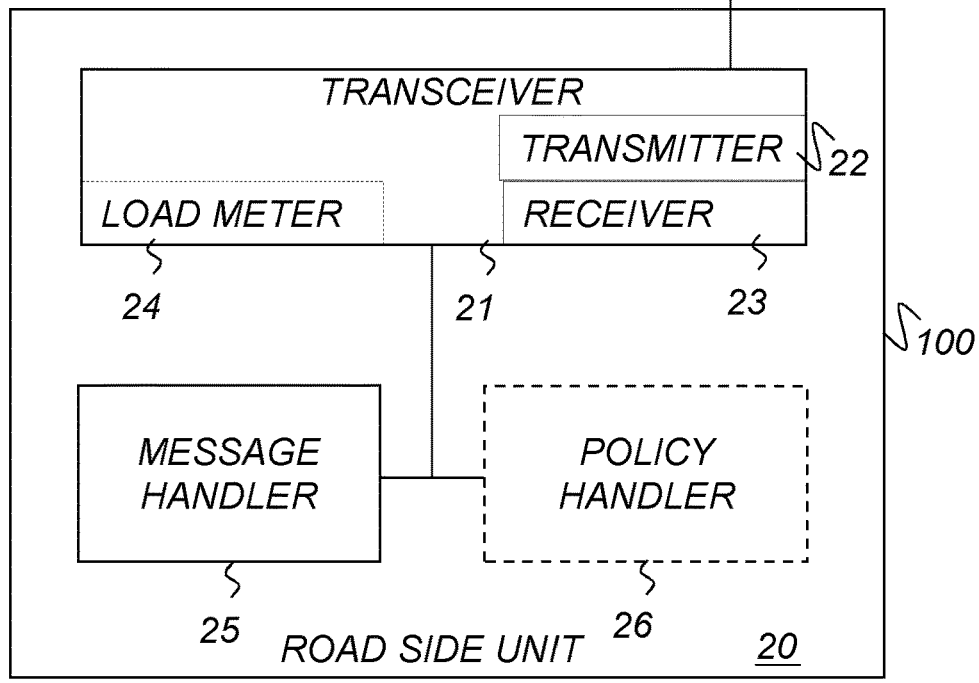
FIG. 5 illustrates schematically an embodiment of a road side unit.

FIG. 5 illustrates schematically an embodiment of a RSU 20. The RSU 20 comprises a transceiver 21 having a transmitter 22 and a receiver 23 and being connected to an antenna 27. The transceiver 21 preferably also comprises a load meter 24, being able to monitor a load of the traffic in radio resources dedicated to the ITS. The RSU further comprises a message handler 25. The message handler 25 is configured for creating a transmission restriction control message. As already being described further above, the transmission restriction control message comprises restriction instructions, defining how a transmission restriction demand is to be applied by an on board unit, and validity information.

Preferably, the message handler 25 is configured for comprising an identification of a restriction area for which the transmission restriction demand is valid into said validity information. Preferably, the message handler 25 is configured for comprising a definition of a restriction time interval for which the transmission restriction demand is valid into the validity information. Most preferably, both these functions of the message handler 25 are provided for.

Preferably, the message handler 25 is configured also for comprising a definition of messages to which the transmission restriction demand is to be applied into the restriction instructions. Preferably, the message handler 25 is configured for comprising a requested transmission timing of messages to which the transmission restriction demand is to be applied into the restriction instructions. Most preferably, both these functions of the message handler 25 are provided for.

The transmitter 22 of the RSU 20 is connected to the message handler 25. The transmitter 22 is configured for broadcasting the transmission restriction control message created by the message handler 25. Preferably, the transmitter is configured for performing the broadcasting repeatedly. This can be performed regularly or intermittently. Preferably, the transmitter 22 is configured for performing the broadcasting over a dedicated wireless communication resource, dedicated for broadcasting of transmission restriction control messages.

In a preferred embodiment, the RSU 20 further comprises a policy handler 26, connected to the message handler 25. The policy handler 26 is configured for obtaining a transmission restriction policy. This enables the message handler 25 to perform the action of creating the transmission restriction control message according to the transmission restriction policy obtained by the policy handler 26. The transmission restriction policy may be a stationary transmission restriction policy stored in the RSU 20. However, preferably, also the transmission restriction policy is possible to update. One possibility for enabling such flexibility is to receive the transmission restriction policy from the main ITS network. To that end, the policy handler 26 is preferably connected to the receiver 23, which is configured for receiving the transmission restriction policy from a control node of the cooperative intelligent transport system.

As mentioned further above, the transmission restriction policy may also be conditional, depending on e.g. external events. Such events could e.g. messages from OBUs about traffic accidents or weather conditions. The events may also be concluded from e.g. communication load monitoring. In one embodiment, the RSU 20 further comprises a load meter 24, connected to the message handler 25, and configured for measuring a load in the transmission resources dedicated to the cooperative intelligent transport system. This enables the message handler 25 to be triggered to creating the transmission restriction control message if the measured load exceeds a predetermined threshold. The predetermined threshold may be a part of the transmission restriction policy.

Figure 6:
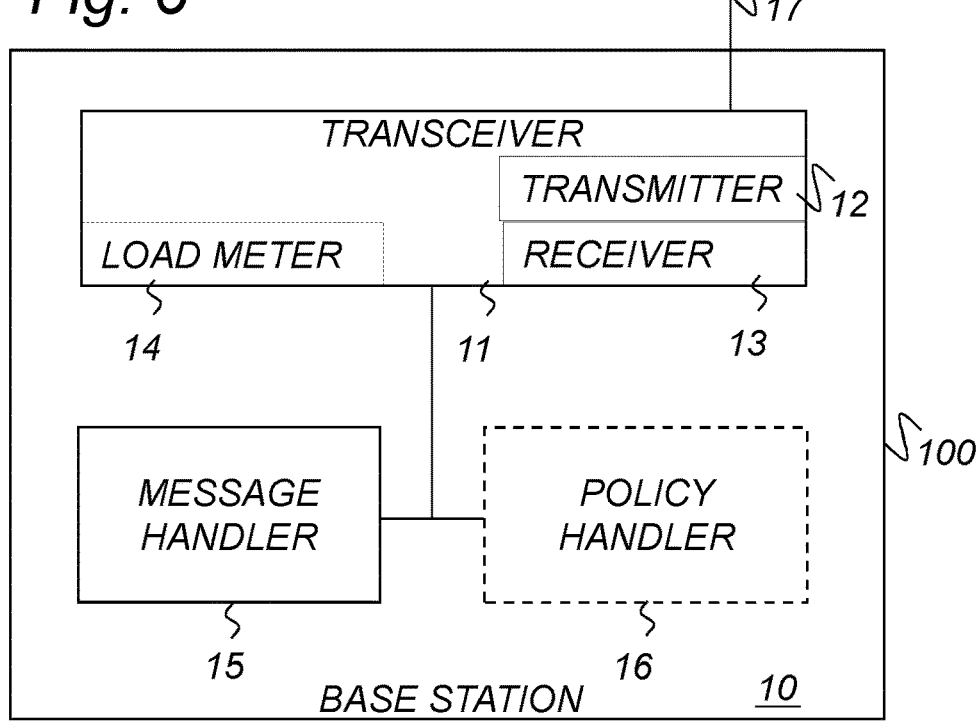
FIG. 6 illustrates schematically an embodiment of a base station.

In FIG. 5, a node 100 of the cooperative intelligent transport system having capabilities of creating and broadcasting a transmission restriction control message is exemplified as a RSU 20. Another embodiment of a node 100 of the cooperative intelligent transport system having capabilities of creating and broadcasting a transmission restriction control message is a base station 10 connected to the cooperative intelligent transport system, as illustrated in FIG. 6. The base station 10 comprises in analogy with what was described above a transceiver 11 having a transmitter 12 and being connected to an antenna 17, and a message handler 15. Preferably, the transceiver 11 also comprises a receiver 13 and a load meter 14, and the base station 10 preferably also comprises a policy handler 16.

The proposed technology may be applied to a node, which may be a wired and/or wireless device.

As used herein, the term "wired device" may refer to any device configured or prepared for wired connection to a network. In particular, the wired device may be at least some of the devices presented further below as wireless devices, with or without radio communication capability, when configured for wired connection.

As used herein, the non-limiting term "node" or "network node" may refer to base stations, access points, network control nodes such as network controllers, radio network controllers, base station controllers, access controllers, and the like. In particular, the term "base station" may encompass different types of radio base stations including standardized base stations such as Node Bs, or evolved Node Bs (eNB) and also macro/micro/pico radio base stations, home base stations, also known as femto base stations, relay nodes, repeaters, radio access points, Base Transceiver Stations (BTS), and even radio control nodes controlling one or more Remote Radio Units (RRU), or the like.

In the following, the general non-limiting term "communication unit" includes network nodes and/or associated wireless devices.

As used herein, the term "network device" may refer to any device located in connection with a communication network, including but not limited to devices in access networks, core networks and similar network structures. The term network device may also encompass cloud-based network devices.

Figure 7:
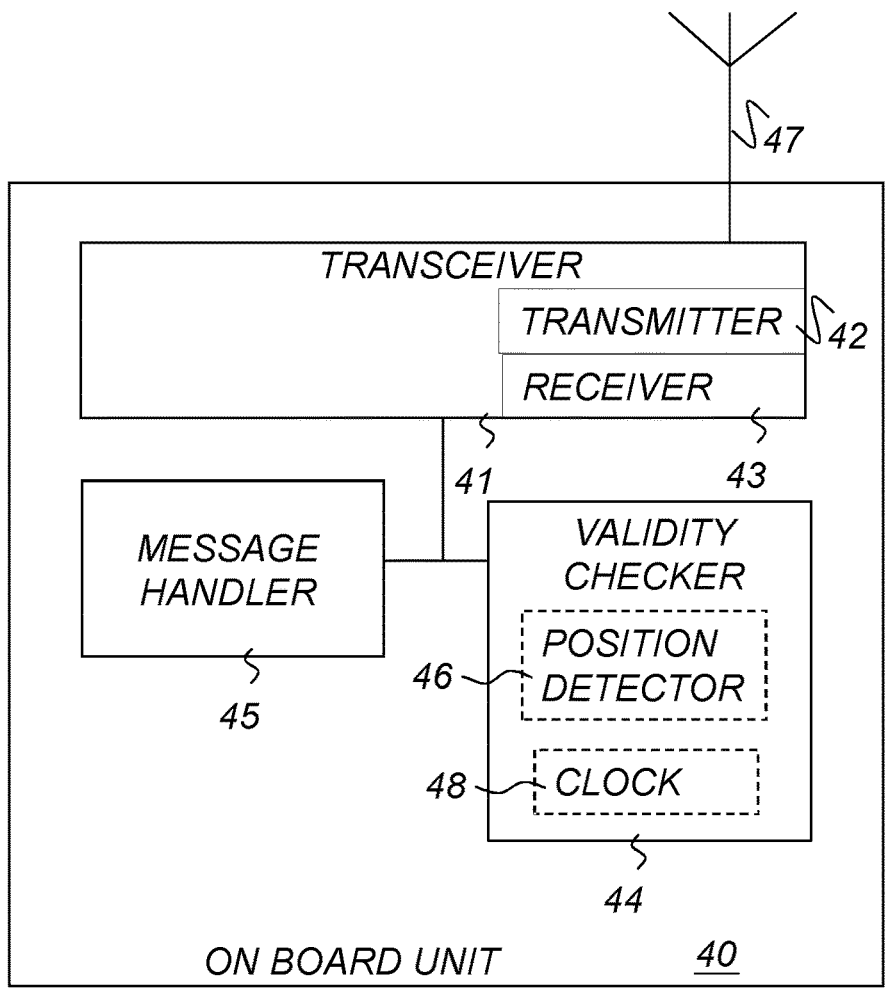
FIG. 7 illustrates schematically an embodiment of an on-board unit.

FIG. 7 illustrates schematically an embodiment of an OBU 40 of a cooperative intelligent transport system. The OBU 40 comprises a transceiver 41, having a receiver 43 and a transmitter 42. The receiver 43 is configured for receiving a transmission restriction control message. In analogy with what was described above, the transmission restriction control message comprises restriction instructions, defining how a transmission restriction demand is to be applied by said on board unit, and validity information. The OBU 40 further comprises a validity checker 44, connected to the receiver 43. The validity checker 44 determines whether or not the on board unit 40 fulfils the validity information. The OBU 40 also comprises a message handler 45, connected to the validity checker 44. The message handler 45 manages messages to be transmitted from the on board unit 40. The message handler conditionally adapts such transmissions of messages according to the restriction instructions, if the on board unit 40 fulfils the validity information.

Preferably, the OBU 40 further comprises a position detector 46, connected to or incorporated in the validity checker 44. The position detector 46, typically a GPS receiver or a wireless communication positioning unit, is configured for obtaining of a current position of the on board unit 40. The validity information then preferably comprises an identification of a restriction area for which the transmission restriction demand is valid. The validity checker 44 is configured for determining whether or not the current position of the on board unit 40 is situated within the restriction area.

Preferably, the OBU 40 further comprises a clock 48, connected to or incorporated in the validity checker 44. The clock 48, typically a system clock of a processor, registers a current time. The validity information then preferably comprises a definition of a restriction time interval for which the transmission restriction demand is valid. The validity checker 44 is configured for determining whether or not the current time falls within the restriction time interval.

Preferably, the restriction instructions comprise a definition of messages to which the transmission restriction demand is to be applied. The message handler 45 is then configured for performing the adapting on messages fulfilling the definition of messages. The definition of messages to which the transmission restriction demand is to be applied may be e.g. message types, message priority, and/or messages transmitted from particular types of transmitting nodes. Also preferably, the restriction instructions comprise a requested transmission timing of messages to which the transmission restriction demand is to be applied. The message handler 45 is then configured for performing the adapting according to the requested transmission timing. The requested transmission timing comprises at least one of a shortest allowed time between successive transmissions and no transmissions at all permitted.

Preferably, the validity checker 44 is configured for re-performing the determining whether or not the on board unit 40 still fulfils the validity information. This is performed regularly or intermittently. The message handler 45 is then configured for interrupting the adapting if the on board unit 40 no longer fulfils said validity information.

Preferably, the receiver 43 is configured for performed the receiving over a dedicated wireless communication resource.

Preferably, the receiver 43 is configured for receiving more than one different transmission restriction control message. The message handler 45 is then configured for performing the adapting according to a most restrictive combination of transmission restriction control message whose validity information is fulfilled by the on board unit 40.

The proposed technology may be applied to a wireless communication device.

As used herein, the non-limiting terms "User Equipment (UE)", "station (STA)" and "wireless communication device" may refer to a mobile phone, a cellular phone, a Personal Digital Assistant (PDA) equipped with radio communication capabilities, a smart phone, a laptop or Personal Computer (PC) equipped with an internal or external mobile broadband modem, a tablet PC with radio communication capabilities, a target device, a device to device UE, a machine type UE or UE capable of machine to machine communication, iPAD, Customer Premises Equipment (CPE), Laptop Embedded Equipment (LEE), Laptop Mounted Equipment (LME), Universal Serial Bus (USB) dongle, a portable electronic radio communication device, a sensor device equipped with radio communication capabilities or the like. In particular, the term "UE", the term "Station" and the term "wireless communication device" should be interpreted as non-limiting terms comprising any type of wireless device communicating with a network node in a wireless communication system and/or possibly communicating directly with another wireless communication device. In other words, a wireless communication device may be any device equipped with circuitry for wireless communication according to any relevant standard for communication.

Figure 8:
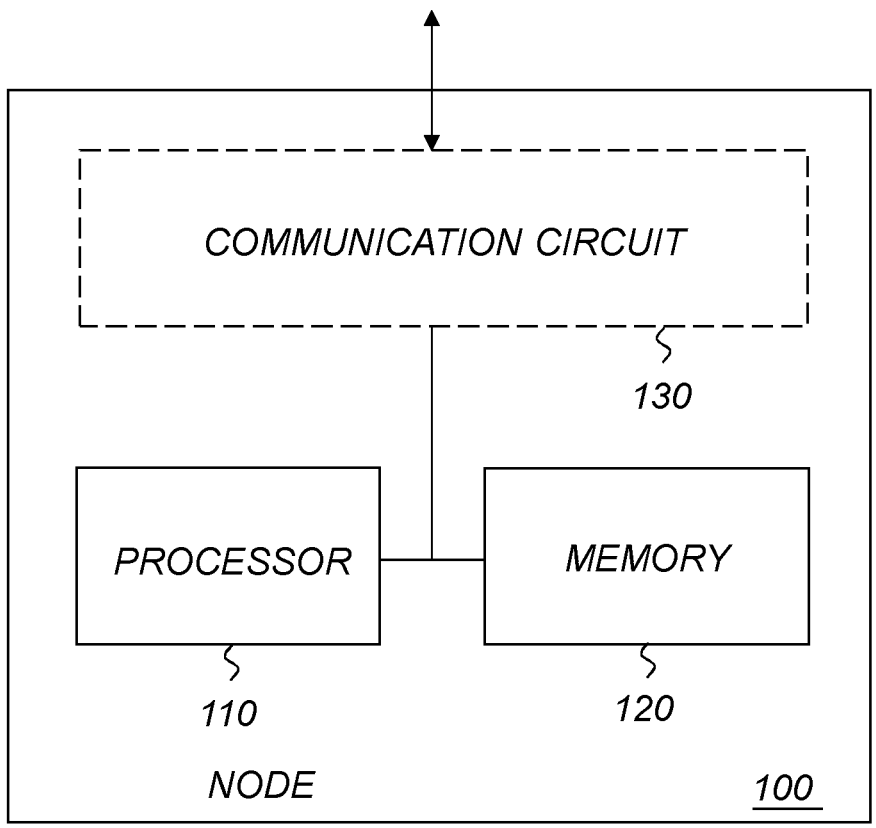
FIG. 8 is a schematic illustration of an embodiment of a node in a cooperative intelligent transport system.

FIG. 8 is a schematic block diagram illustrating an example of a node 100, based on a processor-memory implementation according to an embodiment for communication with on board units in a cooperative intelligent transport system. The node 100 is configured to create a transmission restriction control message. The transmission restriction control message comprises restriction instructions, defining how a transmission restriction demand is to be applied by an on board unit, and validity information. The node 100 is further configured to broadcast the transmission restriction control message.

In this particular example, the node 100 comprises a processor 110 and a memory 120, the memory 120 comprising instructions executable by the processor 110, whereby the processor is operative to create the transmission restriction control message.

The node 100 may also include a communication circuit 130. The communication circuit 130 may include functions for wired and/or wireless communication with other devices and/or network nodes in the network. In a particular example, the communication circuit 130 may be based on radio circuitry for communication with one or more other nodes, including transmitting and/or receiving information.

The communication circuit 130 may be interconnected to the processor 110 and/or memory 120. By way of example, the communication circuit 130 may include any of the following: a receiver, a transmitter, a transceiver, input/output (I/O) circuitry, input port(s) and/or output port(s). The communication circuitry 130 is configured to broadcast the transmission restriction control message.

Preferably, the validity information comprises an identification of a restriction area for which the transmission restriction demand is valid.

Preferably, the validity information comprises a definition of a restriction time interval for which the transmission restriction demand is valid.

Preferably, the restriction instructions comprise a definition of messages to which the transmission restriction demand is to be applied. The definition of messages to which the transmission restriction demand is to be applied comprises preferably message types, message priority, and/or messages transmitted from particular types of transmitting nodes.

Preferably, the restriction instructions comprise a requested transmission timing of messages to which the transmission restriction demand is to be applied. The requested transmission timing comprises preferably a shortest allowed time between successive transmissions and/or no transmissions at all permitted.

Preferably, the node is configured to perform the broadcasting repeatedly. This is performed regularly or intermittently.

In one embodiment, the node is configured to perform the broadcasting over an area within said restriction area.

In one embodiment, the node is configured to perform the broadcasting over an area outside the restriction area.

Preferably, the node is configured to perform the broadcasting over a dedicated wireless communication resource.

Preferably, the node is further configured to obtain a transmission restriction policy, whereby the creating of the transmission restriction control message is performed according to the obtained restriction policy. Preferably, the node is configured to perform the obtaining of the transmission restriction policy by receiving the transmission restriction policy from a control node of the cooperative intelligent transport system. Preferably, the transmission restriction policy comprises definitions of time intervals during which the broadcasting is to be performed, compulsory or conditionally.

Preferably, the node is configured to perform the creating triggered by an external event. Preferably, the node is further configured to measure a load in the transmission resources dedicated to the cooperative intelligent transport system, whereby the node is configured to trig the creating if the measured load exceeds a predetermined threshold.

In one embodiment, the node 100 is a road side unit 20.
In one embodiment, the node 100 is a base station 10 connected to the cooperative intelligent transport system.

Figure 9:
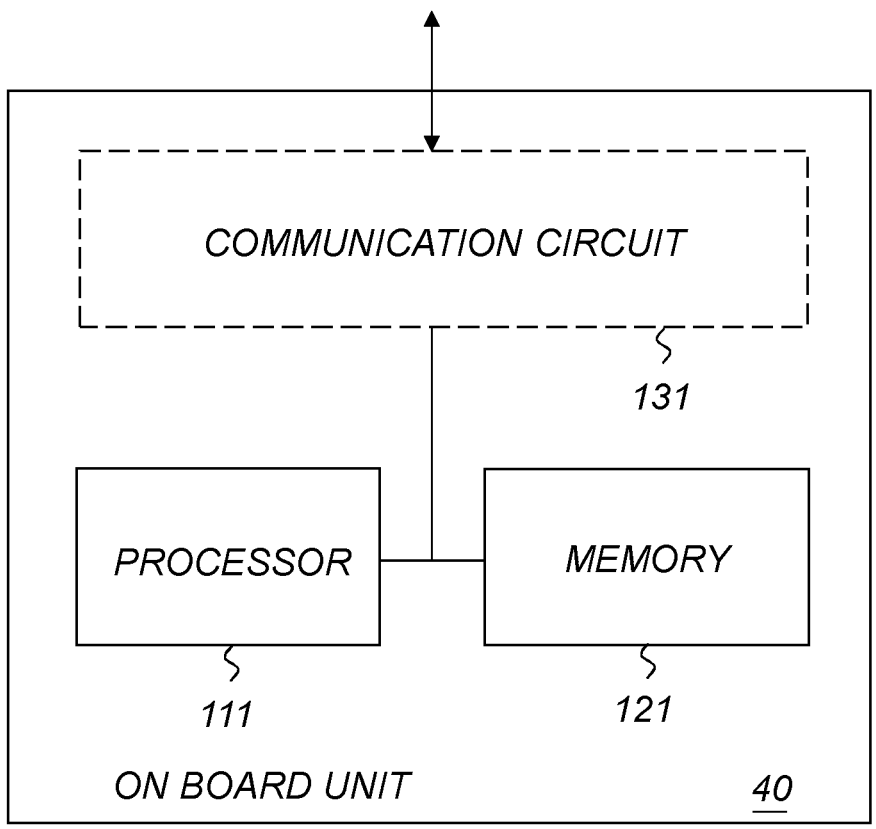
FIG. 9 is a schematic illustration of an embodiment of an on board unit in a cooperative intelligent transport system.

FIG. 9 is a schematic block diagram illustrating an example of an on board unit 40 of a cooperative intelligent transport system, based on a processor-memory implementation according to an embodiment. The on board unit 40 is configured to receive a transmission restriction control message. The transmission restriction control message comprises restriction instructions, defining how a transmission restriction demand is to be applied by the on board unit, and validity information. The on board unit 40 is configured to determine whether or not the on board unit fulfils the validity information. The on board unit 40 is configured to adapt, if the on board unit fulfils the validity information, transmissions from the on board unit of messages according to the restriction instructions.

In this particular example, the OBU 40 comprises a processor 111 and a memory 121, the memory 121 comprising instructions executable by the processor 111, whereby the processor is operative to determine whether or not the on board unit fulfils the validity information and whereby the processor is operative to adapt, if the on board unit fulfils the validity information, transmissions from the on board unit of messages according to the restriction instructions.

Preferably, the on board unit 40 may also include a communication circuit 131. The communication circuit 131 may include functions for wired and/or wireless communication with other devices and/or network nodes in the network. In a particular example, the communication circuit 131 may be based on radio circuitry for communication with one or more other nodes, including transmitting and/or receiving information. The communication circuit 131 may be interconnected to the processor 111 and/or memory 121. By way of example, the communication circuit 131 may include any of the following: a receiver, a transmitter, a transceiver, input/output (I/O) circuitry, input port(s) and/or output port(s). The communication circuitry is configured to receive the transmission restriction control message.

Preferably, the on board unit 40 is further configured to obtain a current position of the on board unit 40. The validity information comprises an identification of a restriction area for which the transmission restriction demand is valid. The on board unit 40 is configured to perform the determining whether or not the on board unit fulfils the validity information by comprising determining whether or not the current position of the on board unit is situated within the restriction area.

Preferably, the on board unit 40 is further configured to register a current time. The validity information comprises a definition of a restriction time interval for which the transmission restriction demand is valid. The on board unit 40 is configured to perform the determining whether or not the on board unit 40 fulfils said validity information by comprising determining whether or not the current time falls within the restriction time interval.

Preferably, the restriction instructions comprise a definition of messages to which the transmission restriction demand is to be applied. The on board unit is configured to perform the adapting on messages fulfilling the definition of messages. The definition of messages to which the transmission restriction demand is to be applied comprises preferably message types, message priority, and/or messages transmitted from particular types of transmitting nodes.

Preferably, the restriction instructions comprise a requested transmission timing of messages to which the transmission restriction demand is to be applied. The on board unit 40 is configured to perform the adapting according to the requested transmission timing. The requested transmission timing comprises preferably a shortest allowed time between successive transmissions and/or no transmissions at all permitted.

Preferably, the on board unit 40 is further configured to, regularly or intermittently, re-performing the determining whether or not the on board unit 40 still fulfils said validity information. The on board unit 40 is configured to interrupt the adapting if the on board unit no longer fulfils the validity information.

Preferably, the on board unit 40 is configured to perform the receiving over a dedicated wireless communication resource.

Preferably, the on board unit 40 is configured to receive more than one different transmission restriction control message. The on board unit 40 is configured to perform the adapting according to a most restrictive combination of transmission restriction control message whose validity information is fulfilled by the on board unit 40. In one embodiment, at least two of the more than one different transmission restriction control message are received from different broadcasting nodes. In another embodiment, at least two of the more than one different transmission restriction control message are received from a same broadcasting node but at different occasions.

Figure 10:
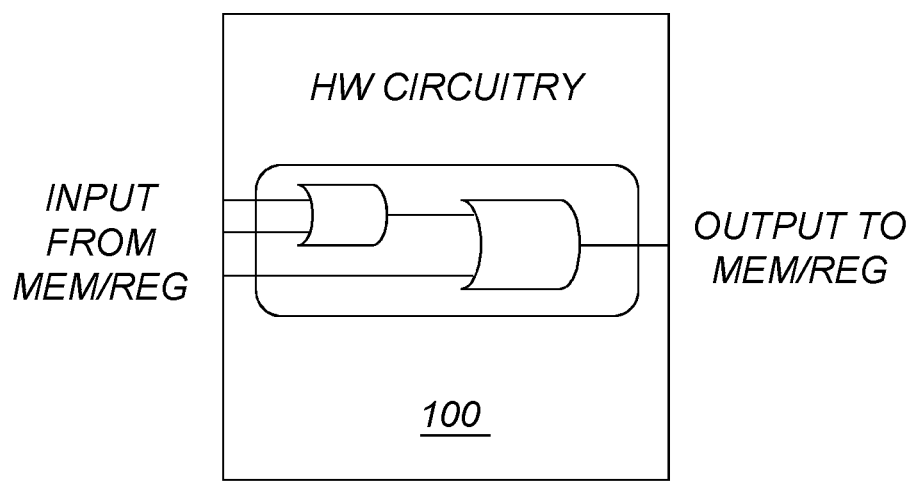
FIG. 10 is a schematic illustration of another embodiment of a node in a cooperative intelligent transport system.

FIG. 10 is a schematic block diagram illustrating another example of a node 100, based on a hardware circuitry implementation according to an embodiment. Particular examples of suitable hardware (HW) circuitry include one or more suitably configured or possibly reconfigurable electronic circuitry, e.g. Application Specific Integrated Circuits (ASICs), Field Programmable Gate Arrays (FPGAs), or any other hardware logic such as circuits based on discrete logic gates and/or flip-flops interconnected to perform specialized functions in connection with suitable registers (REG), and/or memory units (MEM).

Figure 11:
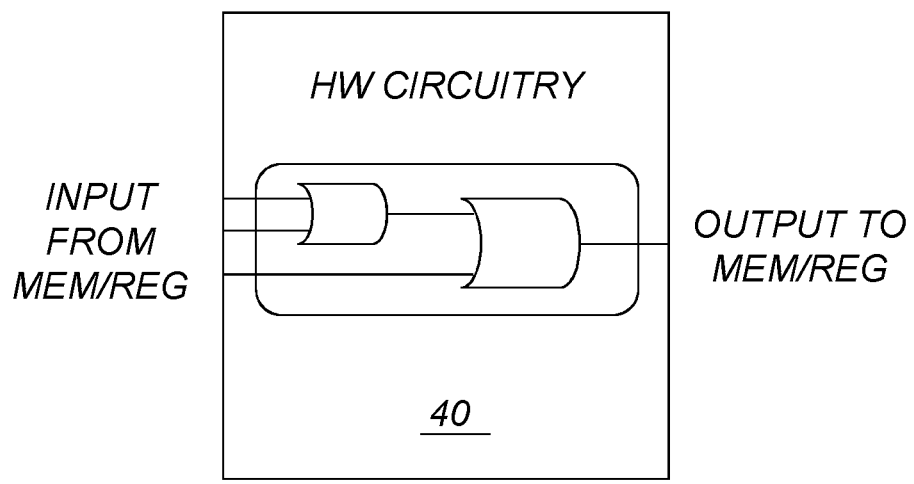
FIG. 11 is a schematic illustration of another embodiment of an on board unit in a cooperative intelligent transport system.

FIG. 11 is a schematic block diagram illustrating another example of an on board unit 40, based on a hardware circuitry implementation according to an embodiment. Particular examples of suitable hardware (HW) circuitry include one or more suitably configured or possibly reconfigurable electronic circuitry, e.g. Application Specific Integrated Circuits (ASICs), Field Programmable Gate Arrays (FPGAs), or any other hardware logic such as circuits based on discrete logic gates and/or flip-flops interconnected to perform specialized functions in connection with suitable registers (REG), and/or memory units (MEM).

Figure 12:
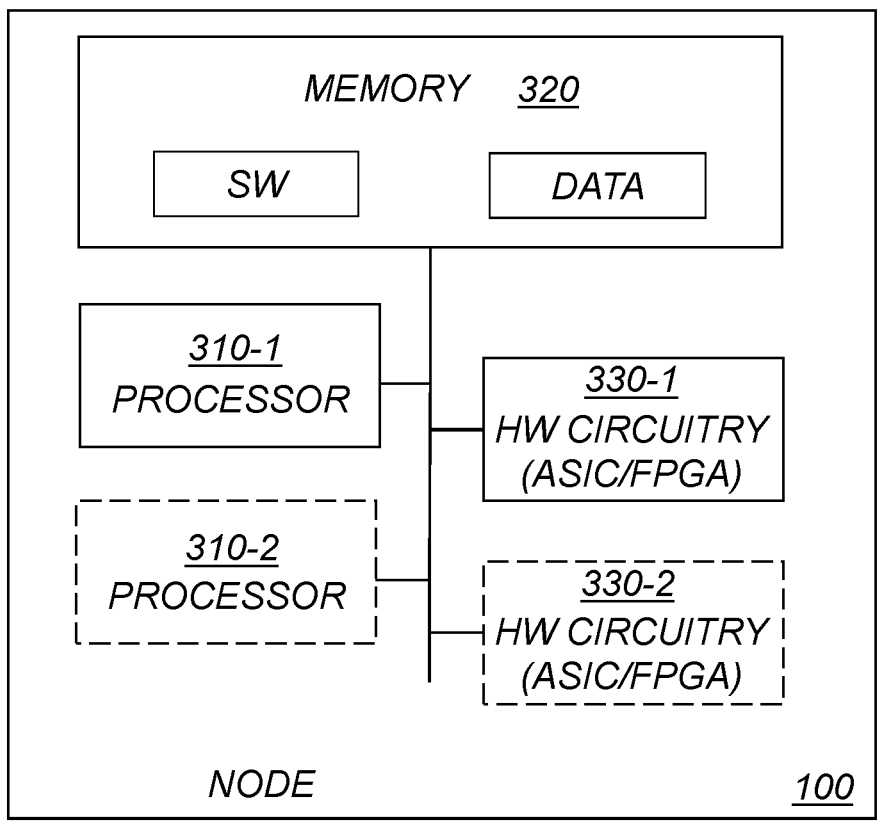
FIG. 12 is a schematic illustration of yet another embodiment of a node in a cooperative intelligent transport system.

FIG. 12 is a schematic block diagram illustrating yet another example of a node 100, based on combination of both processor(s) 310-1, 310-2 and hardware circuitry 330-1, 330-2 in connection with suitable memory unit(s) 320. The node 100 comprises one or more processors 310-1, 310-2, memory 320 including storage for software and data, and one or more units of hardware circuitry 330-1, 330-2 such as ASICs and/or FPGAs. The overall functionality is thus partitioned between programmed software (SW) for execution on one or more processors 310-1, 310-2, and one or more pre-configured or possibly reconfigurable hardware circuits 330-1, 330-2 such as ASICs and/or FPGAs. The actual hardware-software partitioning can be decided by a system designer based on a number of factors including processing speed, cost of implementation and other requirements.

Figure 13:
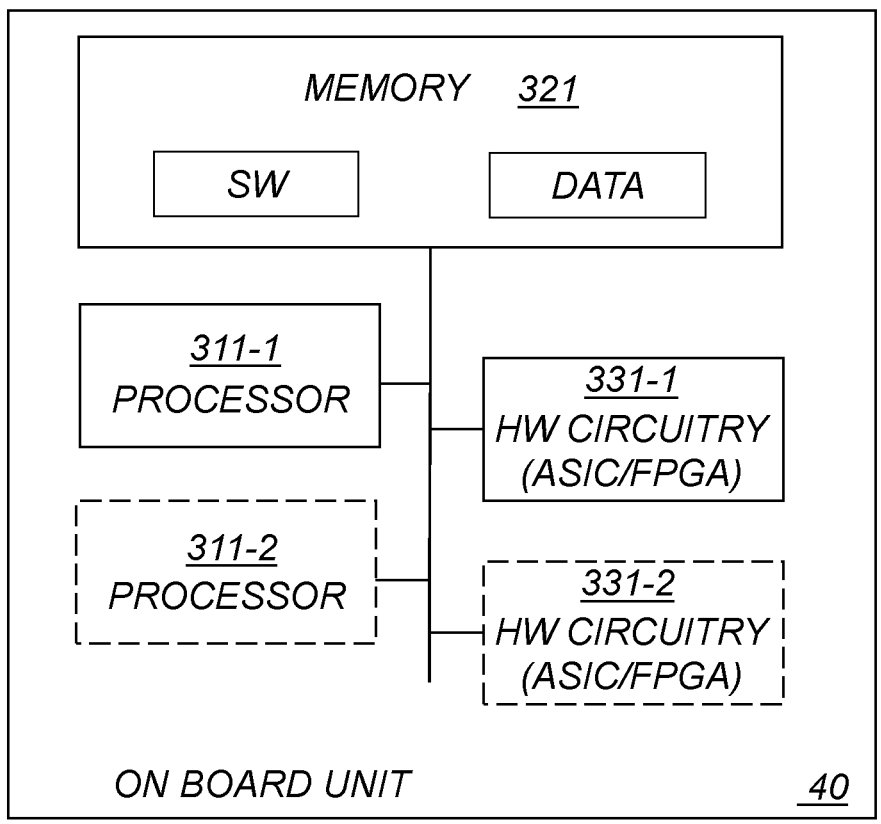
FIG. 13 is a schematic illustration of yet another embodiment of an on board unit in a cooperative intelligent transport system.

FIG. 13 is a schematic block diagram illustrating yet another example of an on board unit 40, based on combination of both processor(s) 311-1, 311-2 and hardware circuitry 331-1, 331-2 in connection with suitable memory unit(s) 321. The on board unit 40 comprises one or more processors 311-1, 311-2, memory 321 including storage for software and data, and one or more units of hardware circuitry 331-1, 331-2 such as ASICs and/or FPGAs. The overall functionality is thus partitioned between programmed software (SW) for execution on one or more processors 311-1, 311-2, and one or more pre-configured or possibly reconfigurable hardware circuitry 331-1, 331-2 such as ASICs and/or FPGAs. The actual hardware-software partitioning can be decided by a system designer based on a number of factors including processing speed, cost of implementation and other requirements.

Alternatively, or as a complement, at least some of the steps, functions, procedures, modules and/or blocks described herein may be implemented in software such as a computer program for execution by suitable processing circuitry such as one or more processors or processing units.

The flow diagram or diagrams presented herein may therefore be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

Figure 14:
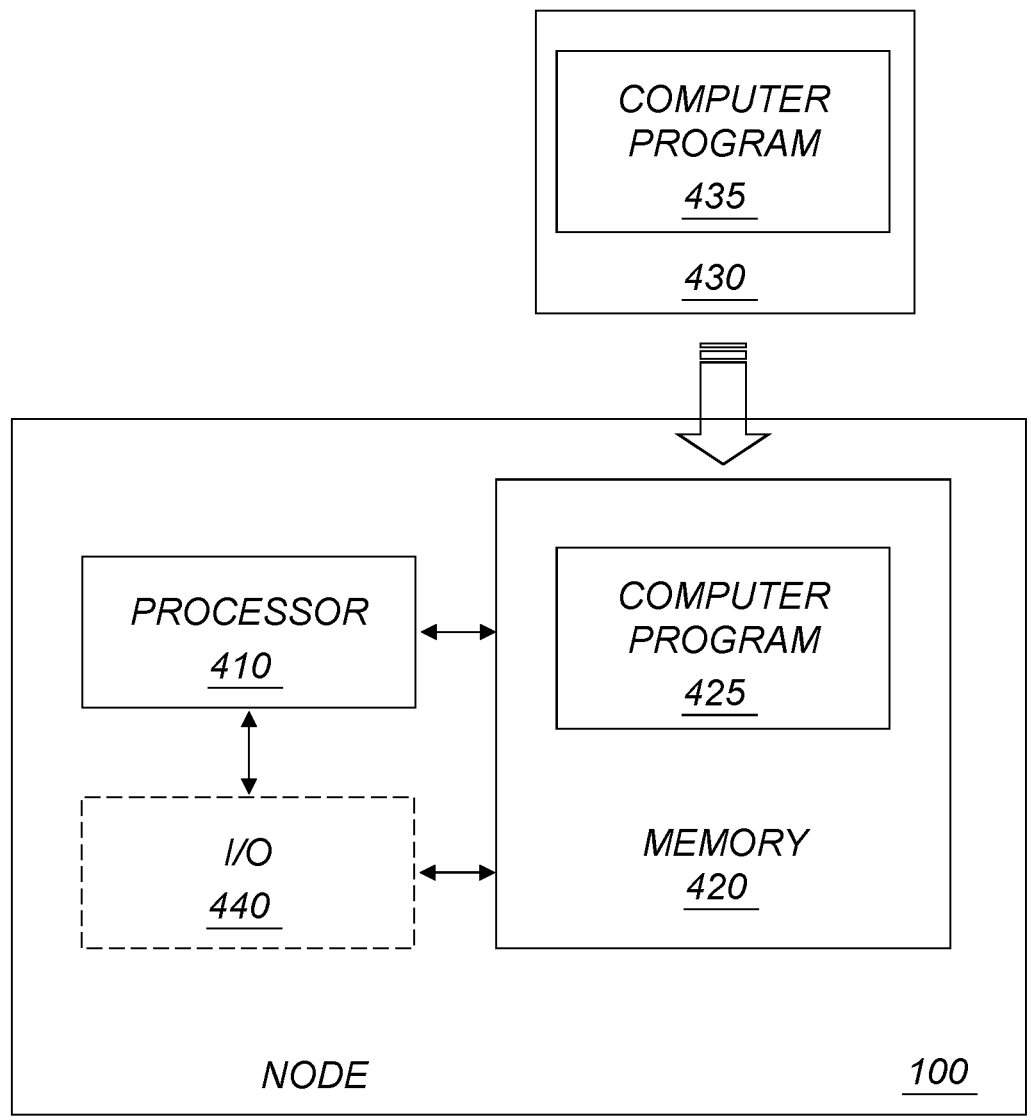
FIG. 14 is a schematic illustration of yet another embodiment of a node in a cooperative intelligent transport system.

FIG. 14 is a schematic diagram illustrating an example of a computer-implementation of a node 100 according to an embodiment. In this particular example, at least some of the steps, functions, procedures, modules and/or blocks described herein are implemented in a computer program 425; 435, which is loaded into the memory 420 for execution by processing circuitry including one or more processors 410. The processor(s) 410 and memory 420 are interconnected to each other to enable normal software execution. An optional input/output device 440 may also be interconnected to the processor(s) 410 and/or the memory 420 to enable input and/or output of relevant data such as input parameter(s) and/or resulting output parameter(s).

Figure 15:
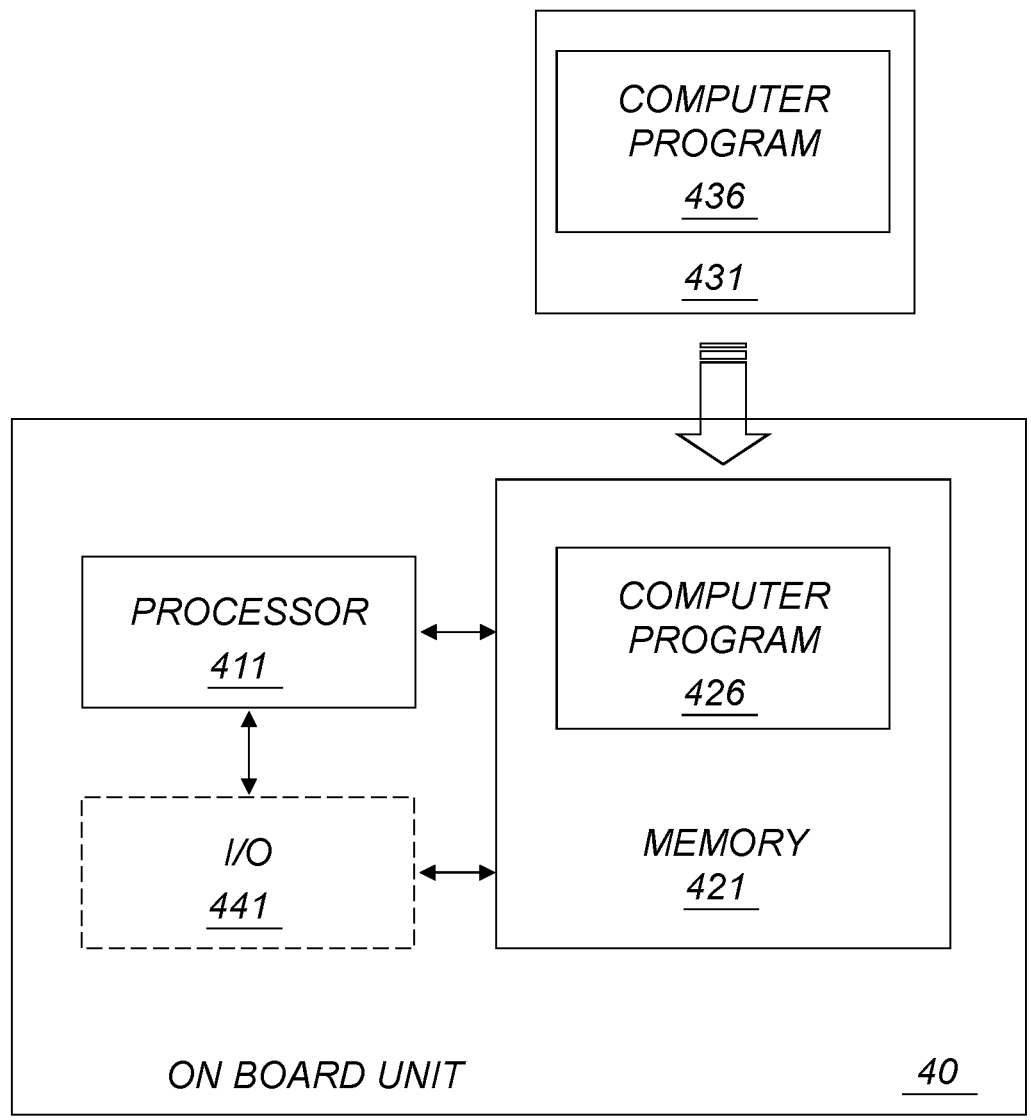
FIG. 15 is a schematic illustration of yet another embodiment of an on board unit in a cooperative intelligent transport system.

FIG. 15 is a schematic diagram illustrating an example of a computer-implementation of an on board unit 40 according to an embodiment. In this particular example, at least some of the steps, functions, procedures, modules and/or blocks described herein are implemented in a computer program 426; 436, which is loaded into the memory 421 for execution by processing circuitry including one or more processors 411. The processor(s) 411 and memory 421 are interconnected to each other to enable normal software execution. An optional input/output device 441 may also be interconnected to the processor(s) 411 and/or the memory 421 to enable input and/or output of relevant data such as input parameter(s) and/or resulting output parameter(s).

The term 'processor' should be interpreted in a general sense as any system or device capable of executing program code or computer program instructions to perform a particular processing, determining or computing task.

The processing circuitry including one or more processors 410 or 411 is thus configured to perform, when executing the computer program 425 or 426, respectively, well-defined processing tasks such as those described herein.

The processing circuitry does not have to be dedicated to only execute the above-described steps, functions, procedure and/or blocks, but may also execute other tasks.

In a particular embodiment, with reference to FIG. 14, the computer program 425; 435 comprises instructions, which when executed by at least one processor 410, cause the processor(s) 410 to create a transmission restriction control message, which transmission restriction control message comprising restriction instructions, defining how a transmission restriction demand is to be applied by an on board unit and validity information, and further cause the at least one processor to broadcast the transmission restriction control message.

Such a computer program may be stored on a computer-readable medium and form a part of a computer-program product. A carrier may comprise that computer program, wherein the carrier is one of an electronic signal, an optical signal, an electromagnetic signal, a magnetic signal, an electric signal, a radio signal, a microwave signal, or a computer-readable storage medium.

By way of example, the software or computer program 425; 435 may be realized as a computer program product, which is normally carried or stored on a computer-readable medium 420; 430, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

In a particular embodiment, with reference to FIG. 15, the computer program 426; 436 comprises instructions, which when executed by at least one processor 411, cause the processor(s) 411 to receive a transmission restriction control message, which transmission restriction control message comprising restriction instructions, defining how a transmission restriction demand is to be applied by the on board unit 40 and validity information, further cause the at least one processor to determine whether or not the on board unit 40 fulfils the validity information, and further cause the at least one processor to adapt, if the on board unit 40 fulfils the validity information, transmissions from the on board unit 40 of messages according to the restriction instructions.

Such a computer program may be stored on a computer-readable medium and form a part of a computer-program product. A carrier may comprise that computer program, wherein the carrier is one of an electronic signal, an optical signal, an electromagnetic signal, a magnetic signal, an electric signal, a radio signal, a microwave signal, or a computer-readable storage medium.

By way of example, the software or computer program 426; 436 may be realized as a computer program product, which is normally carried or stored on a computer-readable medium 421; 431, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

Figure 16:
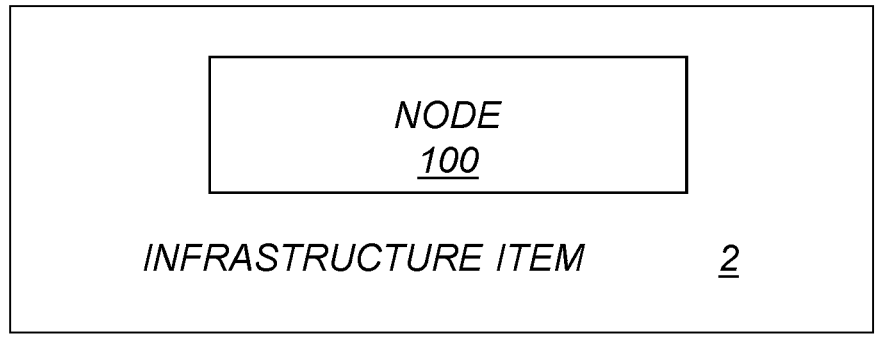
FIG. 16 is a schematic illustration of an embodiment of an infrastructure item in a cooperative intelligent transport system.

FIG. 16 is a schematic block diagram illustrating an example of an infrastructure item 2 comprising a node 100 according to any of the embodiments.

Figure 17:
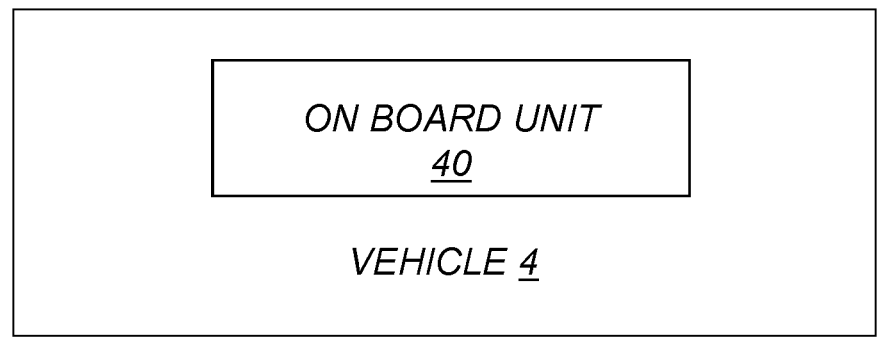
FIG. 17 is a schematic illustration of an embodiment of a vehicle in a cooperative intelligent transport system.

FIG. 17 is a schematic block diagram illustrating an example of a vehicle 4 comprising an onboard unit 40 according to any of the embodiments.

Figure 18:
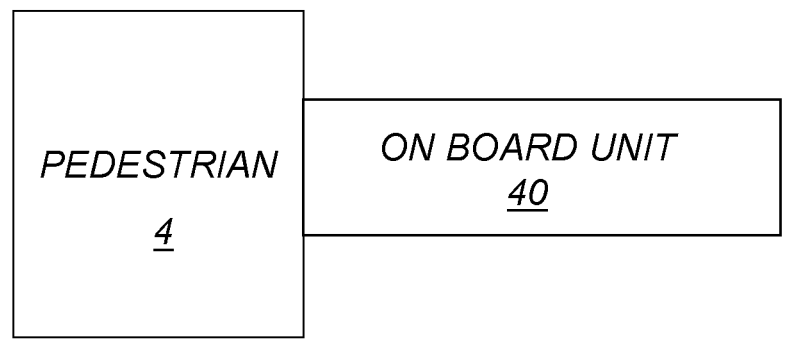
FIG. 18 is a schematic illustration of an embodiment of a pedestrian in a cooperative intelligent transport system.

FIG. 18 is a schematic block diagram illustrating an example of a pedestrian 4 carrying an on board unit 40 according to any of the embodiments.

The network device, i.e. an RSU or and OBU, may be any suitable network device in the wireless communication system, or a network device in connection with the wireless communication system. By way of example, the network device may be a suitable network node such a base station or an access point. However, the network device may alternatively be a cloud-implemented network device.

According to another aspect, there is provided a network device in a wireless communication system, wherein the network device comprises an OBU or RSU as described herein. The communication unit may be any suitable communication unit in the wireless communication system. By way of example, the communication unit may be a wireless communication device such as a UE, STA or similar end-user device.

The flow diagram or diagrams presented herein may be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

The computer program residing in memory may thus be organized as appropriate function modules configured to perform, when executed by the processor, at least part of the steps and/or tasks described herein.

Figure 19:
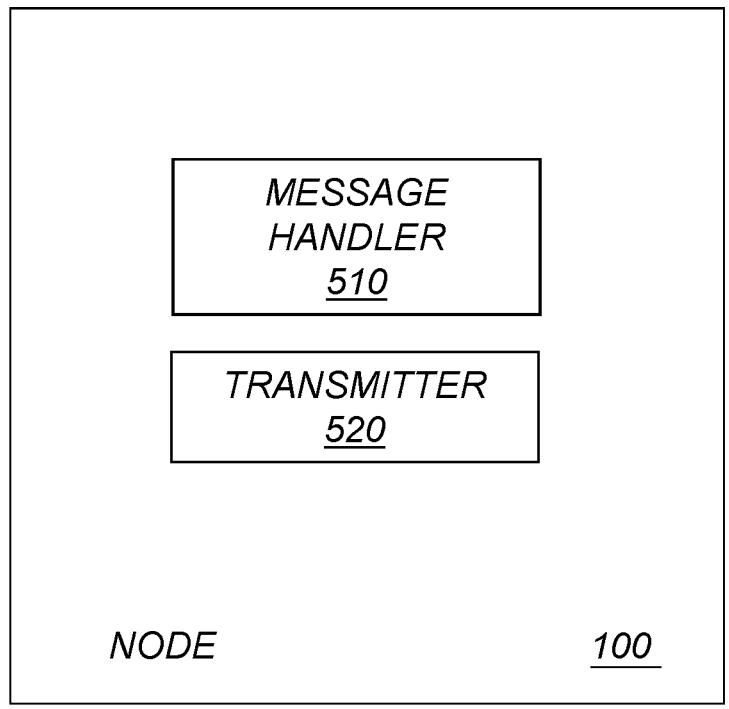
FIG. 19 is a schematic illustration of yet another embodiment of a node in a cooperative intelligent transport system.

FIG. 19 is a schematic diagram illustrating an example of a node 100 for communication with on board units in a cooperative intelligent transport system. The node 100 comprises a message handler module 510 for creating a transmission restriction control message. The transmission restriction control message comprises restriction instructions, defining how a transmission restriction demand is to be applied by an on board unit, and validity information. The node 100 further comprises a transmitter module 520 for broadcasting of the transmission restriction control message.

Figure 20:
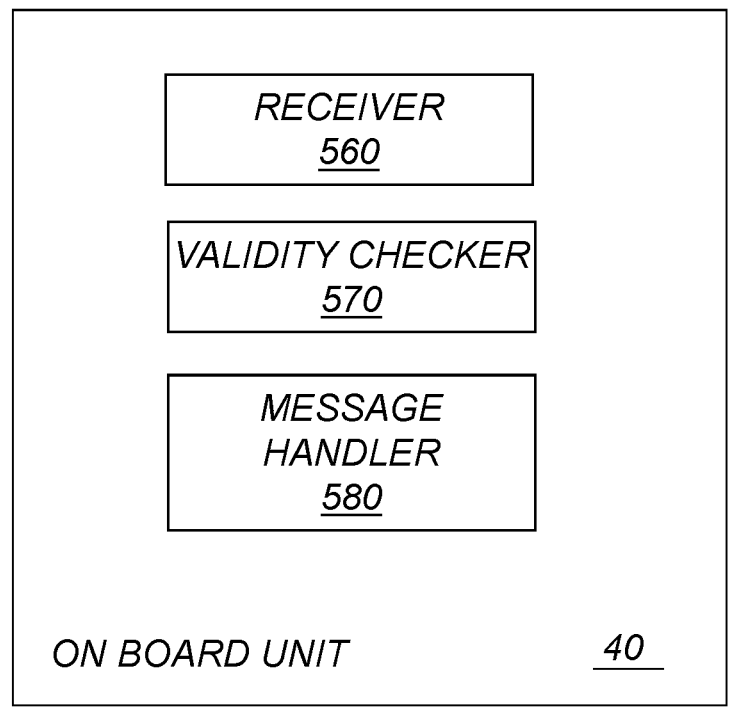
FIG. 20 is a schematic illustration of yet another embodiment of an on board unit in a cooperative intelligent transport system.

FIG. 20 is a schematic diagram illustrating an example of an on board unit 40 for communication within a cooperative intelligent transport system. The on board unit 40 comprises a receiver module 560 for receiving a transmission restriction control message. The transmission restriction control message comprises restriction instructions, defining how a transmission restriction demand is to be applied by the on board unit 40, and validity information. The on board unit 40 further comprises a validity checker module 570 for determining whether or not the on board unit fulfils the validity information. The on board unit 40 further comprises a message handler module 580 for adapting, if the on board unit fulfils the validity information, transmissions from the on board unit 40 of messages according to the restriction instructions.

Alternatively, it is possible to realize the module(s) in FIGS. 19 and 20 predominantly by hardware modules, or alternatively by hardware, with suitable interconnections between relevant modules. Particular examples include one or more suitably configured digital signal processors and other known electronic circuits, e.g. discrete logic gates interconnected to perform a specialized function, and/or Application Specific Integrated Circuits (ASICs) as previously mentioned. Other examples of usable hardware include input/output (I/O) circuitry and/or circuitry for receiving and/or sending signals. The extent of software versus hardware is purely implementation selection.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

ABBREVIATIONS

3GPP $3^{rd}$ Generation Partnership Project
5G $5^{th}$ Generation
ASIC Application Specific Integrated Circuits
BTS Base Transceiver Stations
CAM Cooperative Awareness Message
CD Compact Disc
C-ITS Cooperative ITS
CPU Central Processing Units
D2D device to device
DENM Decentralized Environment Notification Message
DSP Digital Signal Processors
DSRC Dedicated Short-range communication
DVD Digital Versatile Disc
eNB evolved Node B
FPGA Field Programmable Gate Arrays
HDD Hard Disk Drive
HW hardware
I/O input/output
ITS Intelligent Transport System
LEE Laptop Embedded Equipment
LME Laptop Mounted Equipment
LTE Long-Term Evolution
MEM memory units
MNO Mobile Network Operator
OEM Original Equipment Maker (e.g. the car manufacturer)
PC Personal Computer
PC5 3GPP sidelink interface used for direct D2D communication
PDA Personal Digital Assistant
PLC Programmable Logic Controllers
RAM Random Access Memory
REG registers
ROM Read-Only Memory
RRU Remote Radio Units
RSU Road Side Unit
RTA Road Traffic Authority
STA Station
SW software
UE User Equipment
USB Universal Serial Bus
V2I vehicle to infrastructure
V2N vehicle to network
V2P vehicle to pedestrian
V2V vehicle to vehicle
V2X Vehicle to "anything"

The invention claimed is:
1. A method for message control in a cooperative intelligent transport system, the method comprising:

creating a transmission restriction control message, said transmission restriction control message comprising: i) a restriction instruction to be applied by an on-board unit and ii) validity information indicating a condition under which the restriction instruction is valid, wherein the restriction instruction comprises transmitter type information specifying one or more transmitter node types to which the restriction instruction applies; and broadcasting said transmission restriction control message.

2. A method for message control in a cooperative intelligent transport system, the method comprising:
receiving, at an on-board unit, a transmission restriction control message, said transmission restriction control message comprising: i) a restriction instruction to be applied by said on-board unit and ii) validity information indicating a condition under which the restriction instruction is valid, wherein the restriction instruction comprises transmitter type information specifying one or more transmitter node types to which the restriction instruction applies;
determining whether or not said on-board unit satisfies the condition; and
as a result of determining that said on-board unit satisfies the condition, adapting transmissions from said on-board unit of messages according to said restriction instruction.

3. A node configured for communication with on-board units in a cooperative intelligent transport system, wherein said node is configured to:
create a transmission restriction control message comprising: i) a restriction instruction to be applied by an on-board unit and ii) validity information indicating a condition under which the restriction instruction is valid, wherein the restriction instruction comprises transmitter type information specifying one or more transmitter node types to which the restriction instruction applies; and
broadcast said transmission restriction control message.

4. The node of claim 3, wherein said node comprises a processor and a memory, said memory comprising instructions executable by the processor, whereby the processor is operative to create said transmission restriction control message.

5. The node of claim 3, wherein said node comprises communication circuitry configured to broadcast said transmission restriction control message.

6. The node of claim 3, wherein said validity information comprises an identification of the restriction area for which the restriction instructions are valid.

7. The node of claim 3, wherein
said validity information comprises a definition of the restriction time interval during which the restriction instructions are valid, and
the restriction instruction comprises transmission restriction information indicating a transmission restriction and message type information identifying one or more message types to which the transmission restriction applies.

8. The node of claim 3, wherein said restriction instructions comprise a definition of messages to which a transmission restriction demand is to be applied.

9. The node of claim 8, wherein said definition of messages to which said transmission restriction demand is to be applied comprises at least one of message types, message priority, and messages transmitted from particular types of transmitting nodes.

10. The node of claim 3, wherein said restriction instructions comprise a requested transmission timing of messages to which a transmission restriction demand is to be applied.

11. The node of claim 10, wherein said requested transmission timing indicates that no transmission is permitted.

12. The node of claim 3, wherein said node is configured to broadcast said transmission restriction control message during a first period of time and to rebroadcast said transmission restriction control message during a second period of time that is subsequent to the first period of time.

13. The node of claim 3, wherein said node is configured to perform said broadcasting over a dedicated wireless communication resource.

14. The node of claim 3, wherein said node is further configured to obtain a transmission restriction policy, whereby said creating of said transmission restriction control message is performed according to said obtained restriction policy.

15. The node of claim 14, wherein said node is configured to perform said obtaining of said transmission restriction policy by receiving information identifying said transmission restriction policy from a control node of said cooperative intelligent transport system.

16. The node of claim 14, wherein said transmission restriction policy comprises definitions of time intervals during which said broadcasting is to be performed, compulsory or conditionally.

17. The node of claim 3, wherein said node is configured to perform said creating triggered by an external event.

18. The node of claim 3, wherein said node is further configured to measure a load in transmission resources dedicated to said cooperative intelligent transport system, whereby said node is configured to trigger said creating if said measured load exceeds a predetermined threshold.

19. An on-board unit of a cooperative intelligent transport system, wherein said on-board unit is configured to:
receive a transmission restriction control message, said transmission restriction control message comprising: i) a restriction instruction to be applied by said on-board unit and ii) validity information indicating a condition under which the restriction instruction is valid, wherein the restriction instruction comprises transmitter type information specifying one or more transmitter node types to which the restriction instruction applies;
determine whether or not said on-board unit fulfils said validity information; and
adapt, if said on-board unit fulfils said validity information, transmissions from said on-board unit of messages according to said restriction instruction.

20. A computer program product comprising a non-transitory computer readable medium storing a computer program comprising instructions, which when executed by at least one processor of a device, cause the device to perform the method of claim 2.

21. The method of claim 2, wherein one of said one or more transmitter node types is non-emergency vehicles.

22. The method of claim 1, wherein the restriction instruction further comprises frequency information specifying a maximum number of messages that are permitted to be sent within a certain period of time.

* * * * *